United States Patent
Mondelore et al.

(10) Patent No.: US 10,325,628 B2
(45) Date of Patent: Jun. 18, 2019

(54) AUDIO-VISUAL PROJECT GENERATOR

(71) Applicant: Microsoft Technology Licensing, LLC, Redmond, WA (US)

(72) Inventors: David Mondelore, London (GB); Brian Stone, London (GB); Tim Ackroyd, London (GB); David Millard, Liphook (GB); James Shepherd, Cambridge (GB); Kyle Lampe, Potters Bar (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 429 days.

(21) Appl. No.: 15/287,497

(22) Filed: Oct. 6, 2016

(65) Prior Publication Data

US 2017/0040038 A1 Feb. 9, 2017

Related U.S. Application Data

(62) Division of application No. 14/086,891, filed on Nov. 21, 2013, now Pat. No. 9,508,385.

(51) Int. Cl.
*H04N 5/93* (2006.01)
*G11B 27/00* (2006.01)
(Continued)

(52) U.S. Cl.
CPC .......... *G11B 27/036* (2013.01); *A63F 13/63* (2014.09); *A63F 13/655* (2014.09); *A63F 13/86* (2014.09);
(Continued)

(58) Field of Classification Search
CPC .......... G11B 27/036; G11B 20/10527; G11B 27/034; G11B 27/10; G11B 27/34;
(Continued)

(56) References Cited

U.S. PATENT DOCUMENTS

| | | |
|---|---|---|
| 4,627,620 A | 12/1986 | Yang |
| 4,630,910 A | 12/1986 | Ross et al. |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

(Continued)

*Primary Examiner* — Helen Shibru
(74) *Attorney, Agent, or Firm* — Alleman Hall Creasman & Tuttle LLP

(57) ABSTRACT

Embodiments disclosed herein enable a user to generate an audio-visual project. Certain embodiments enable a user to use one of a plurality of predefined templates to generate a project easily and quickly. Other embodiments enable a user to generate a custom project that gives more control to the user, compared to if the user selected one of the predefined templates. Each project includes one or more segments, which may be specified by a user directly, or may be specified by the template selected by the user. An effect is applied to each segment, wherein the effect specifies how many video and audio slots are included in the segment, if any, and can specify one or more other properties of the segment. Projects generated using embodiments disclosed herein can be saved and shared with other users.

20 Claims, 13 Drawing Sheets

(51) Int. Cl.
| | |
|---|---|
| *G11B 27/036* | (2006.01) |
| *G11B 27/034* | (2006.01) |
| *A63F 13/63* | (2014.01) |
| *A63F 13/86* | (2014.01) |
| *G11B 27/10* | (2006.01) |
| *H04N 21/472* | (2011.01) |
| *H04N 21/478* | (2011.01) |
| *H04N 21/4788* | (2011.01) |
| *H04N 21/845* | (2011.01) |
| *A63F 13/655* | (2014.01) |
| *G11B 20/10* | (2006.01) |
| *G11B 27/34* | (2006.01) |

(52) U.S. Cl.
CPC ...... *G11B 20/10527* (2013.01); *G11B 27/034* (2013.01); *G11B 27/10* (2013.01); *G11B 27/34* (2013.01); *H04N 21/4781* (2013.01); *H04N 21/4788* (2013.01); *H04N 21/47205* (2013.01); *H04N 21/8456* (2013.01); *G11B 2020/10537* (2013.01)

(58) Field of Classification Search
CPC ........ A63F 13/63; A63F 13/655; A63F 13/86; H04N 21/47205; H04N 21/4781; H04N 21/4788; H04N 21/8456
USPC .......................... 386/280, 282, 285, 286, 290
See application file for complete search history.

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 6/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,801,708 B1 * | 10/2004 | Takahashi ............ G11B 27/034 386/280 |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |

(56) References Cited

U.S. PATENT DOCUMENTS

| | | |
|---|---|---|
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,248,778 B1 | 7/2007 | Anderson |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,352,952 B2 | 4/2008 | Herberger |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,014 B1* | 4/2010 | Kellock ............... G11B 27/034 375/240.01 |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,006,261 B1* | 8/2011 | Haberman ............ G11B 27/031 725/32 |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,606,083 B2* | 12/2013 | Girgensohn ......... G11B 27/034 386/278 |
| 8,676,024 B2* | 3/2014 | Nakate ................... G11B 27/28 386/246 |
| 9,082,018 B1* | 7/2015 | Laska ................. G06K 9/00711 |
| 9,961,403 B2* | 5/2018 | Kritt ...................... G06F 3/0484 |
| 10,057,537 B1* | 8/2018 | MacDonald-King ...................... H04N 21/8456 |
| 2006/0190391 A1 | 8/2006 | Cullen, III et al. |
| 2007/0046774 A1 | 3/2007 | Silva et al. |
| 2007/0083851 A1 | 4/2007 | Huang |
| 2007/0234214 A1 | 10/2007 | Lovejoy et al. |
| 2008/0026838 A1 | 1/2008 | Dunstan et al. |
| 2008/0320512 A1 | 12/2008 | Knight |
| 2009/0196570 A1 | 8/2009 | Dudas et al. |
| 2010/0183280 A1* | 7/2010 | Beauregard .......... G11B 27/034 386/285 |
| 2011/0218042 A1 | 9/2011 | Anderson et al. |
| 2012/0017153 A1 | 1/2012 | Matusda et al. |
| 2012/0101869 A1 | 4/2012 | Manganelli et al. |
| 2012/0284625 A1 | 11/2012 | Kalish et al. |
| 2013/0094830 A1* | 4/2013 | Stone ..................... H04N 5/775 386/230 |
| 2013/0097643 A1* | 4/2013 | Stone ................. H04N 21/4781 725/61 |
| 2013/0132844 A1 | 5/2013 | Oakley et al. |
| 2013/0151970 A1 | 6/2013 | Achour |
| 2013/0177294 A1* | 7/2013 | Kennberg .......... H04N 13/0282 386/241 |
| 2013/0226647 A1 | 8/2013 | Chory et al. |
| 2013/0226816 A1 | 8/2013 | Chory et al. |
| 2013/0266924 A1 | 10/2013 | Zelin |
| 2013/0272679 A1 | 10/2013 | Cavalcanti |
| 2014/0365938 A1 | 12/2014 | Black et al. |
| 2015/0141140 A1 | 5/2015 | Lampe et al. |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2000039997 A2 | 7/2000 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

(56) References Cited

OTHER PUBLICATIONS

Breen et al., "Interactive Occlusion and Collision of Real and Virtual Objects in Augmented Reality", Technical Report ECRC-95-02, 1995, European Computer-Industry Research Center GmbH, Munich, Germany.
Freeman et al., "Television Control by Hand Gestures", Dec. 1994, Mitsubishi Electric Research Laboratories, TR94-24, Caimbridge, MA.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, vol. 15, No. 6, IEEE Transactions on Pattern Analysis and Machine Intelligence.
Granieri et al., "Simulating Humans in VR", The British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
English Machine-translation of Japanese Publication No. JP08-044490 published on Feb. 16, 1996.
AVS Video Editor 6.2.1.222, 10 TopTenReviews, [http://video-editing-software-review.toptenreviews.com/avs-video-editor-review.html], published Aug. 14, 2012.
Restriction dated Dec. 17, 2015, in U.S. Appl. No. 14/086,891, filed Nov. 21, 2013.
Amendment filed Jan. 19, 2016, in U.S. Appl. No. 14/086,891, filed Nov. 21, 2013.
Office Action dated Feb. 19, 2016 in U.S. Appl. No. 14/086,891, filed Nov. 21, 2013.
Amendment filed May 17, 2016, in U.S. Appl. No. 14/086,891, filed Nov. 21, 2013.
Notice of Allowance dated Jul. 29, 2016, in U.S. Appl. No. 14/086,891, filed Nov. 21, 2013.

* cited by examiner

AUDIO-VISUAL PROJECT GENERATOR

PRIORITY CLAIM

This application is a Divisional of and claims priority U.S. patent application Ser. No. 14/086,891, filed Nov. 21, 2013, which is incorporated herein by reference.

BACKGROUND

Creating professional-looking videos is a difficult task. While existing video editing systems are capable of creating aesthetically pleasing, professional-looking videos, these systems are typically too complex and difficult for most users to easily learn and use in a time efficient manner. For example, with some existing systems, users are required to manually assemble a variety of different elements including video clips, audio clips, titles, effects, narration and background music. Combining these elements into a professional-looking video typically requires advanced skills and a significant time investment.

In recent years, as video gaming has become more and more popular, video game users have begun generated videos that including portions (e.g., highlights) of their gameplay. These video may be uploaded to various video sharing websites so that users can share there videos with their friends, or simply with other users interested in the same video games. Such videos, however, are often not much more than segments of video gameplay that include a voiceover added by the user. While existing video editing systems may be used to make such gameplay videos more professional-looking, existing video editing systems, as mentioned above, are typically too complex and difficult for most users to easily learn and use in a time efficient manner.

SUMMARY

Embodiments disclosed herein enable a user to generate an audio-visual project. Certain embodiments enable a user to use one of a plurality of predefined templates to generate a project easily and quickly. Other embodiments enable a user to generate a custom project that gives more control to the user, compared to if the user selected one of the predefined templates. In an embodiment, the user is given an option as to whether to select one of a plurality of predefined templates, and is also give the option to alternatively generate a custom project.

An embodiment for enabling the user to generate a custom project will first be summarized, wherein such an embodiment may be implemented if the user chooses the option to generate a custom project. When that occurs, various selections are accepted from the user using a graphical user interface. This can include accepting from the user a selection of how many temporal segments are to be included in the project. Additionally, for each segment in the project, there will be an accepting from the user of a selection of an effect that is to be applied to the segment, wherein the selected effect specifies how many video slots are included in the segment and how many audio slots are included in the segment. Each effect can also specifies one or more other properties, including, but not limited to, an intro, an outro, static graphics, moving graphics, a transition, an opacity, a background, a foreground, a border, a cut-scene video and/or a post processing procedure.

Also accepted from the user, for each video slot included in each segment, is a selection or recording of video clip to populate the video slot. Similarly, for each audio slot included in each segment, an audio clip is selected or recorded by the user to populate the audio slot. Thereafter, e.g., in response to the user indicating that the project is finished, an audio-video project file is generated and stored on one or more processor readable storage devices. The audio-video project file, which can be played to present the project to a user, is based on the how many segments are included in the project, how many video and audio slots are included in each segment, the video clips that populate video slots, and the audio clips that populate the audio slots. The audio-video project file is also based on other properties of the one or more effects applied to the one or more segments of the project.

In accordance with an embodiment, video slots that are included in adjacent segments can be chained together to thereby enable a video clip to span more than one of the segments. Similarly, audio slots that are included in adjacent segments can be chained together to thereby enable an audio clip to span more than one of the segments. In accordance with an embodiment, slots can be chained together regardless of their type, so long as they are included in adjacent segments. For example, a video slot in one segment can be chained together with an audio slot in an adjacent segment.

When generating a custom project, a user can add a new segment at selected temporal position relative to one or more other segments included in the project. The user will also be able to remove one or more segments. Additionally, segments can be reordered by the user. In other words, a segment can be moved to from a first temporal position to a second temporal position relative to one or more other segments included in the project.

In accordance with an embodiment, for each video slot, the user will have the option to record a video clip for inclusion in the video slot, and an option to select a pre-recorded video clip for inclusion in the video slot. Similarly, for each audio slot, the user will have the option to record an audio clip for inclusion in the audio slot, and an option to select a pre-recorded audio clip for inclusion in the audio slot. Once a slot is populated with a clip, such a clip can be trimmed by the user, which can adjust the temporal length of the segment that includes the slot.

An embodiment for enabling a user to generate a project using a predefined template will now be summarized. Such an embodiment may be implemented if the user selects one of a plurality of predefined templates, wherein each of the templates specifies how many segments are included in the project. In this embodiment, a skin is applied to the template, wherein the skin specifies a separate effect that is to be applied to each separate segment of the project. The skin can be a default skin for the template or a user selected skin compatible with the template. The effect for each segment of the project specifies how many video slots are included in the segment, how many audio slots are included in the segment, and at least one other property of the segment. Examples of other properties that an effect may specify where mentioned above.

The user still has the ability to select which video clip(s) populate video slots included in segment(s) of the project, and which audio clip(s) populate audio slot(s) included in segment(s) of the project. The user is also able to trim clips. Further, the user can change the skin applied to a template, to thereby change the look-and-feel of the project quickly and easily. In response to the user indicating that the project is finished, an audio-video project file is generated and stored on one or more processor readable storage devices. This audio-video project file can be played to present the project to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Embodiments disclosed herein enable a user to generate an audio-visual project. Certain embodiments enable a user to use one of a plurality of predefined templates to generate a project easily and quickly. Other embodiments enable a user to generate a custom project that gives more control to the user, compared to if the user selected one of the predefined templates. However, before providing additional details of such embodiments of the present technology, exemplary details of larger systems with which embodiments of the present technology can be used will first be described.

Figure 1A:
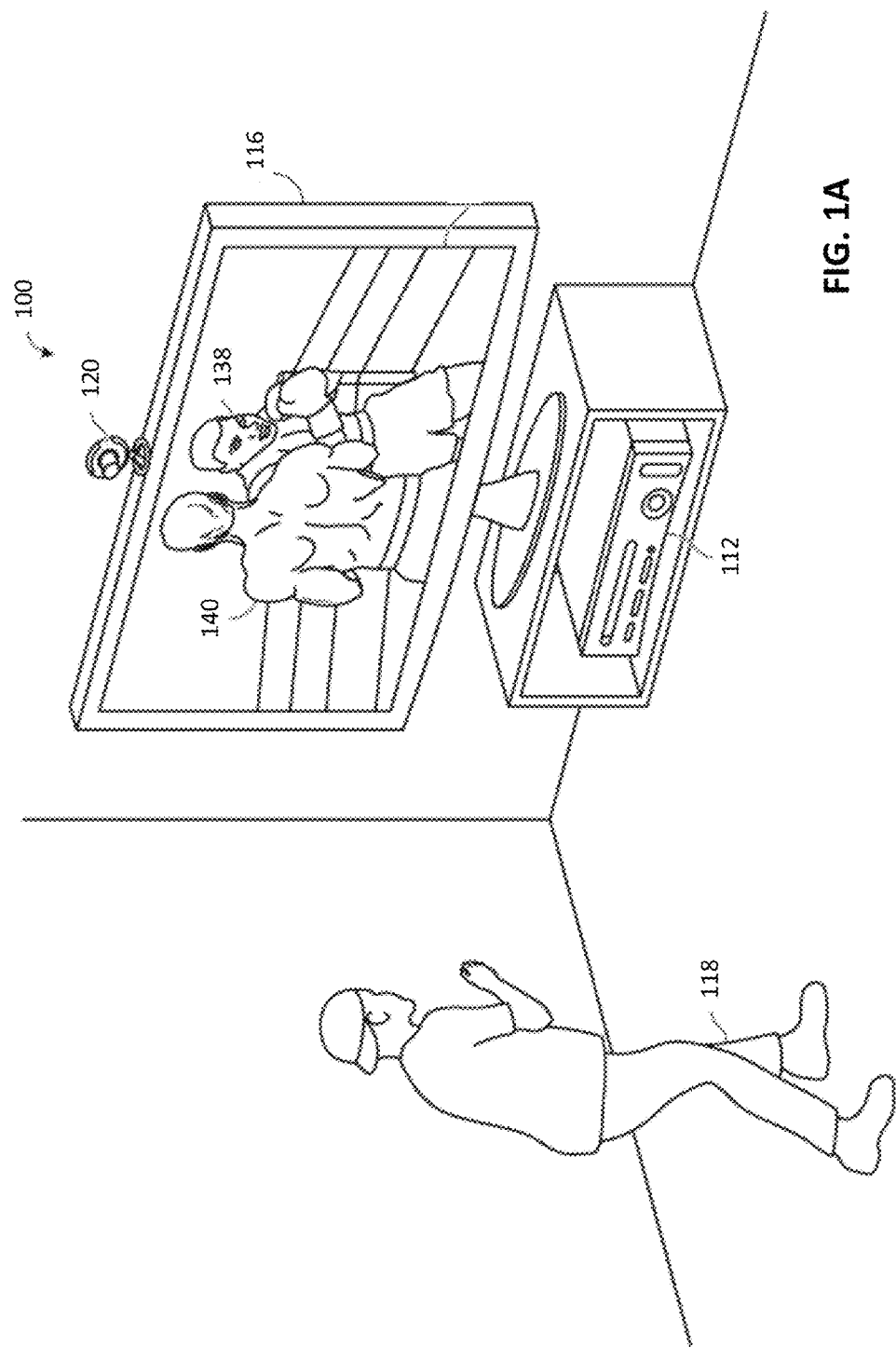
FIGS. 1A and 1B illustrate an example embodiment of a tracking system with a user playing a game.
Figure 1B:
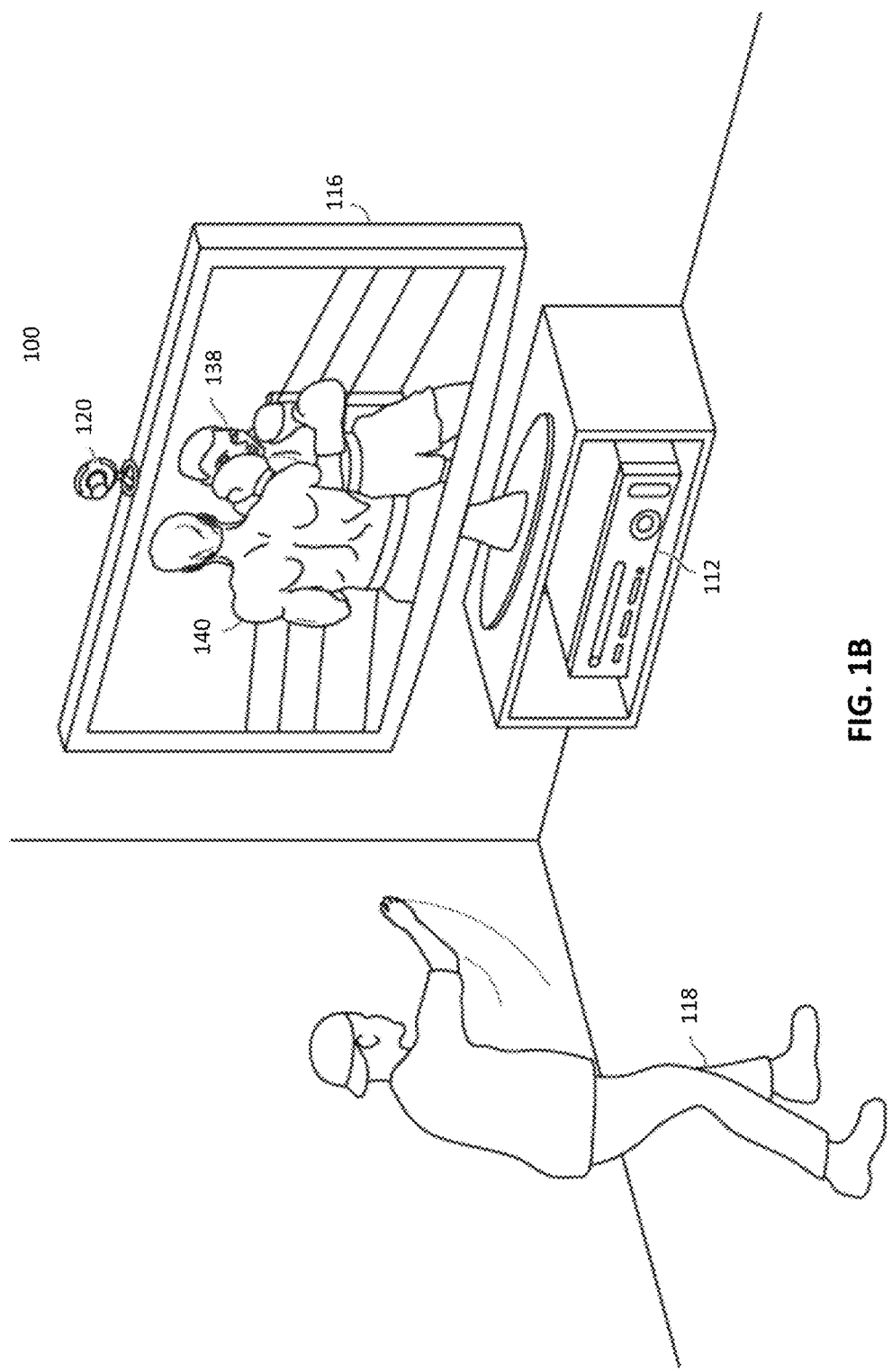

FIGS. 1A and 1B illustrate an example embodiment of a tracking system 100 with a user 118 playing a boxing video game. In an example embodiment, the tracking system 100 may be used to recognize, analyze, and/or track a human target such as the user 118 or other objects within range of the tracking system 100. As shown in FIG. 1A, the tracking system 100 includes a computing system 112 and a capture device 120. As will be describe in additional detail below, the capture device 120 can be used to obtain depth images and color images (also known as RGB images) that can be used by the computing system 112 to identify one or more users or other objects, as well as to track motion and/or other user behaviors. The tracked motion and/or other user behavior can be used to update an application. Therefore, a user can manipulate game characters or other aspects of the application by using movement of the user's body and/or objects around the user, rather than (or in addition to) using controllers, remotes, keyboards, mice, or the like. For example, a video game system can update the position of images displayed in a video game based on the new positions of the objects or update an avatar based on motion of the user.

The computing system 112 may be a computer, a gaming system or console, or the like. According to an example embodiment, the computing system 112 may include hardware components and/or software components such that computing system 112 may be used to execute applications such as gaming applications, non-gaming applications, or the like. In one embodiment, computing system 112 may include a processor such as a standardized processor, a specialized processor, a microprocessor, or the like that may execute instructions stored on a processor readable storage device for performing the processes described herein.

The capture device 120 may include, for example, a camera that may be used to visually monitor one or more users, such as the user 118, such that gestures and/or movements performed by the one or more users may be captured, analyzed, and tracked to perform one or more controls or actions within the application and/or animate an avatar or on-screen character, as will be described in more detail below.

According to one embodiment, the tracking system 100 may be connected to an audiovisual device 116 such as a television, a monitor, a high-definition television (HDTV), or the like that may provide game or application visuals and/or audio to a user such as the user 118. For example, the computing system 112 may include a video adapter such as a graphics card and/or an audio adapter such as a sound card that may provide audiovisual signals associated with the game application, non-game application, or the like. The audiovisual device 116 may receive the audiovisual signals from the computing system 112 and may then output the game or application visuals and/or audio associated with the audiovisual signals to the user 118. According to one embodiment, the audiovisual device 16 may be connected to the computing system 112 via, for example, an S-Video cable, a coaxial cable, an HDMI cable, a DVI cable, a VGA cable, component video cable, but are not limited thereto.

As shown in FIGS. 1A and 1B, the tracking system 100 may be used to recognize, analyze, and/or track a human target such as the user 118. For example, the user 118 may be tracked using the capture device 120 such that the gestures and/or movements of user 118 may be captured to animate an avatar or on-screen character and/or may be interpreted as controls that may be used to affect the application being executed by computing system 112. Thus, according to one embodiment, the user 118 may move his or her body to control the application and/or animate the avatar or on-screen character.

In the example depicted in FIGS. 1A and 1B, the application executing on the computing system 112 may be a boxing game that the user 118 is playing. For example, the computing system 112 may use the audiovisual device 116 to provide a visual representation of a boxing opponent 138 to the user 118. The computing system 112 may also use the audiovisual device 116 to provide a visual representation of a player avatar 140 that the user 118 may control with his or her movements. For example, as shown in FIG. 1B, the user 118 may throw a punch in physical space to cause the player avatar 140 to throw a punch in game space. Thus, according to an example embodiment, the computer system 112 and the capture device 120 recognize and analyze the punch of the user 118 in physical space such that the punch may be interpreted as a game control of the player avatar 140 in game space and/or the motion of the punch may be used to animate the player avatar 140 in game space.

Other movements by the user 118 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 140. For example, in one embodiment, the player may use movements to end, pause, or save a game, select a level, view high scores, communicate with a friend, etc. According to another embodiment, the player may use movements to select the game or other application from a main user interface. Thus, in example embodiments, a full range of motion of the user 118 may be available, used, and analyzed in any suitable manner to interact with an application.

In example embodiments, the human target such as the user 118 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game. Objects not held by the user can also be tracked, such as objects thrown, pushed or rolled by the user (or a different user) as well as self-propelled objects. In addition to boxing, other games can also be implemented.

According to other example embodiments, the tracking system 100 may further be used to interpret target movements as operating system and/or application controls that are outside the realm of games. For example, virtually any controllable aspect of an operating system and/or application may be controlled by movements of the target such as the user 118.

Figure 2:
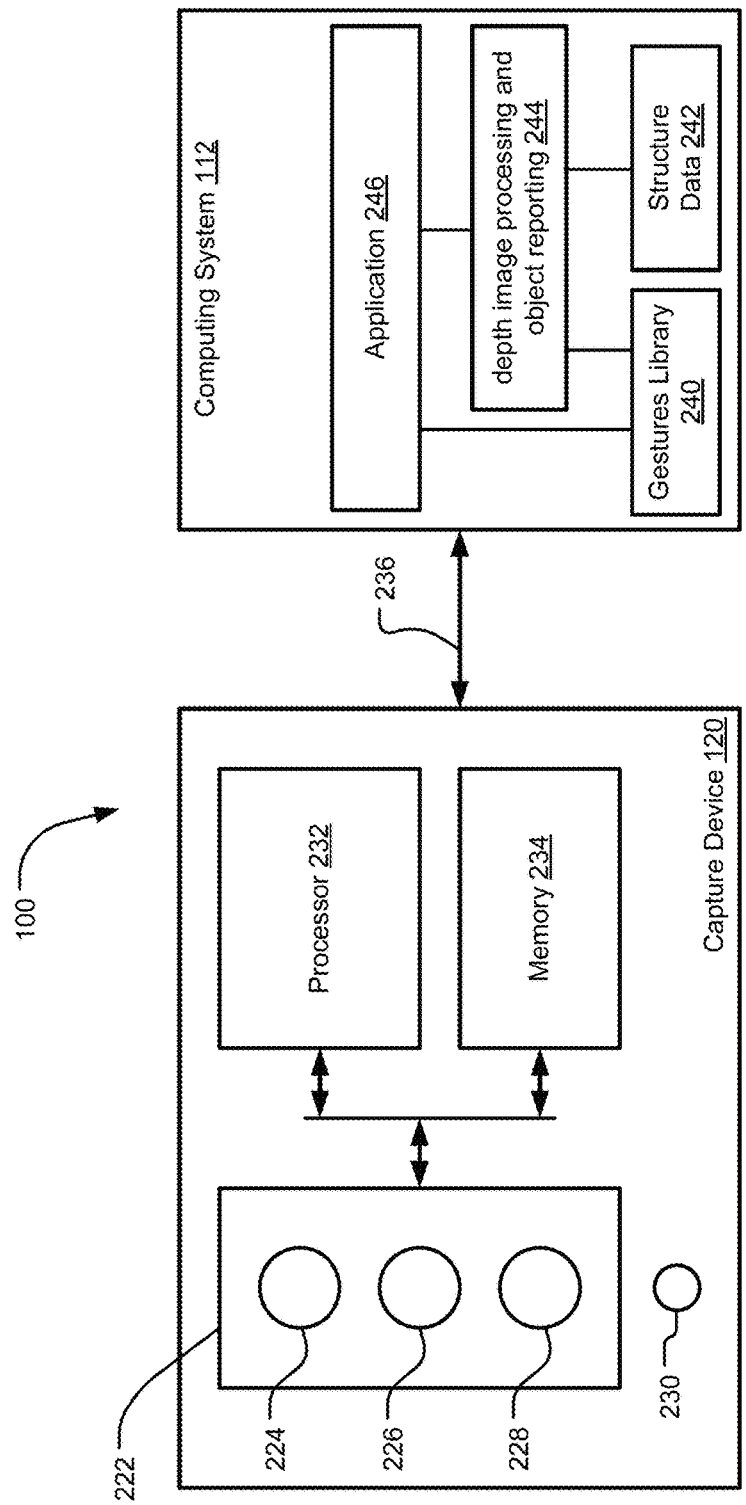
FIG. 2 illustrates an example embodiment of a capture device that may be used as part of the tracking system.

FIG. 2 illustrates an example embodiment of the capture device 120 that may be used in the tracking system 100. According to an example embodiment, the capture device 120 may be configured to capture video with depth information including a depth image that may include depth values via any suitable technique including, for example, time-of-flight, structured light, stereo image, or the like. According to one embodiment, the capture device 120 may organize the depth information into "Z layers," or layers that may be perpendicular to a Z axis extending from the depth camera along its line of sight.

As shown in FIG. 2, the capture device 120 may include an image camera component 222. According to an example embodiment, the image camera component 222 may be a depth camera that may capture a depth image of a scene. The depth image may include a two-dimensional (2-D) or three-dimensional (3-D) pixel area of the captured scene where each pixel in the 2-D or 3-D pixel area may represent a depth value such as a distance in, for example, centimeters, millimeters, or the like of an object in the captured scene from the camera.

As shown in FIG. 2, according to an example embodiment, the image camera component 222 may include an infra-red (IR) light component 224, a three-dimensional (3-D) camera 226, and an RGB camera 228 that may be used to capture the depth image of a scene. For example, in time-of-flight (TOF) analysis, the IR light component 224 of the capture device 120 may emit an infrared light onto the scene and may then use sensors (not specifically shown in FIG. 2) to detect the backscattered light from the surface of one or more targets and objects in the scene using, for example, the 3-D camera 226 and/or the RGB camera 228. In some embodiments, pulsed IR light may be used such that the time between an outgoing light pulse and a corresponding incoming light pulse may be measured and used to determine a physical distance from the capture device 120 to a particular location on the targets or objects in the scene. Additionally or alternatively, the phase of the outgoing light wave may be compared to the phase of the incoming light wave to determine a phase shift. The phase shift may then be used to determine a physical distance from the capture device to a particular location on the targets or objects.

According to another example embodiment, TOF analysis may be used to indirectly determine a physical distance from the capture device 120 to a particular location on the targets or objects by analyzing the intensity of the reflected beam of light over time via various techniques including, for example, shuttered light pulse imaging.

In another example embodiment, the capture device 120 may use a structured light to capture depth information. In such an analysis, patterned light (i.e., light displayed as a known pattern such as grid pattern, a stripe pattern, or different pattern) may be projected onto the scene via, for example, the IR light component 224. Upon striking the surface of one or more targets or objects in the scene, the pattern may become deformed in response. Such a deformation of the pattern may be captured by, for example, the 3-D camera 226 and/or the RGB camera 228 and may then be analyzed to determine a physical distance from the capture device to a particular location on the targets or objects. In some implementations, the IR Light component 224 is displaced from the cameras 226 and 228 so triangulation can be used to determined distance from cameras 226 and 228. In some implementations, the capture device 120 will include a dedicated IR sensor to sense the IR light.

According to another embodiment, the capture device 120 may include two or more physically separated cameras that may view a scene from different angles to obtain visual stereo data that may be resolved to generate depth information. Other types of depth image sensors can also be used to create a depth image.

The capture device 120 may further include a microphone 230, or an array of microphones 230. Each microphone 230 may include a transducer or sensor that may receive and convert sound into an electrical signal. According to one embodiment, the microphone(s) 230 may be used to reduce feedback between the capture device 120 and the computing system 112 in the target recognition, analysis, and tracking system 100. Additionally, the microphone(s) 230 may be used to receive audio signals (e.g., voice commands) that may also be provided by the user to control applications such as game applications, non-game applications, or the like that may be executed by the computing system 112.

In an example embodiment, the capture device 120 may further include a processor 232 that may be in operative communication with the image camera component 222. The processor 232 may include a standardized processor, a specialized processor, a microprocessor, or the like that may execute instructions including, for example, instructions for receiving a depth image, generating the appropriate data format (e.g., frame) and transmitting the data to computing system 112.

The capture device 120 may further include a memory component 234 that may store the instructions that may be executed by the processor 232, images or frames of images captured by the 3-D camera and/or RGB camera, or any other suitable information, images, or the like. According to an example embodiment, the memory component 234 may include random access memory (RAM), read only memory (ROM), cache, Flash memory, a hard disk, or any other suitable storage component. As shown in FIG. 2, in one embodiment, the memory component 234 may be a separate component in communication with the image capture component 222 and the processor 232. According to another embodiment, the memory component 234 may be integrated into the processor 232 and/or the image capture component 222.

As shown in FIG. 2, the capture device 120 may be in communication with the computing system 212 via a communication link 236. The communication link 236 may be a wired connection including, for example, a USB connection, a Firewire connection, an Ethernet cable connection, or the like and/or a wireless connection such as a wireless 802.11b, g, a, or n connection. According to one embodiment, the computing system 112 may provide a clock to the capture device 120 that may be used to determine when to capture, for example, a scene via the communication link 236. Additionally, the capture device 120 provides the depth images and color images captured by, for example, the 3-D camera 226 and/or the RGB camera 228 to the computing system 112 via the communication link 236. In one embodiment, the depth images and color images are transmitted at 30 frames per second. The computing system 112 may then use the model, depth information, and captured images to, for example, control an application such as a game or word processor and/or animate an avatar or on-screen character.

Computing system 112 includes gestures library 240, structure data 242, depth image processing and object reporting module 244 and application 246. Depth image processing and object reporting module 244 uses the depth images to track motion of objects, such as the user and other objects. To assist in the tracking of the objects, depth image processing and object reporting module 244 uses gestures library 240 and structure data 242.

Structure data 242 includes structural information about objects that may be tracked. For example, a skeletal model of a human may be stored to help understand movements of the user and recognize body parts. Structural information about inanimate objects may also be stored to help recognize those objects and help understand movement.

Gestures library 240 may include a collection of gesture filters, each comprising information concerning a gesture that may be performed by the skeletal model (as the user moves). The data captured by the cameras 226, 228 and the capture device 120 in the form of the skeletal model and movements associated with it may be compared to the gesture filters in the gesture library 240 to identify when a user (as represented by the skeletal model) has performed one or more gestures. Those gestures may be associated with various controls of an application. Thus, the computing system 112 may use the gestures library 240 to interpret movements of the skeletal model and to control application 246 based on the movements. As such, gestures library may be used by depth image processing and object reporting module 244 and application 246.

Application 246 can be a video game, productivity application, etc. In one embodiment, depth image processing and object reporting module 244 will report to application 246 an identification of each object detected and the location of the object for each frame. Application 246 will use that information to update the position or movement of an avatar or other images in the display.

Figure 3:
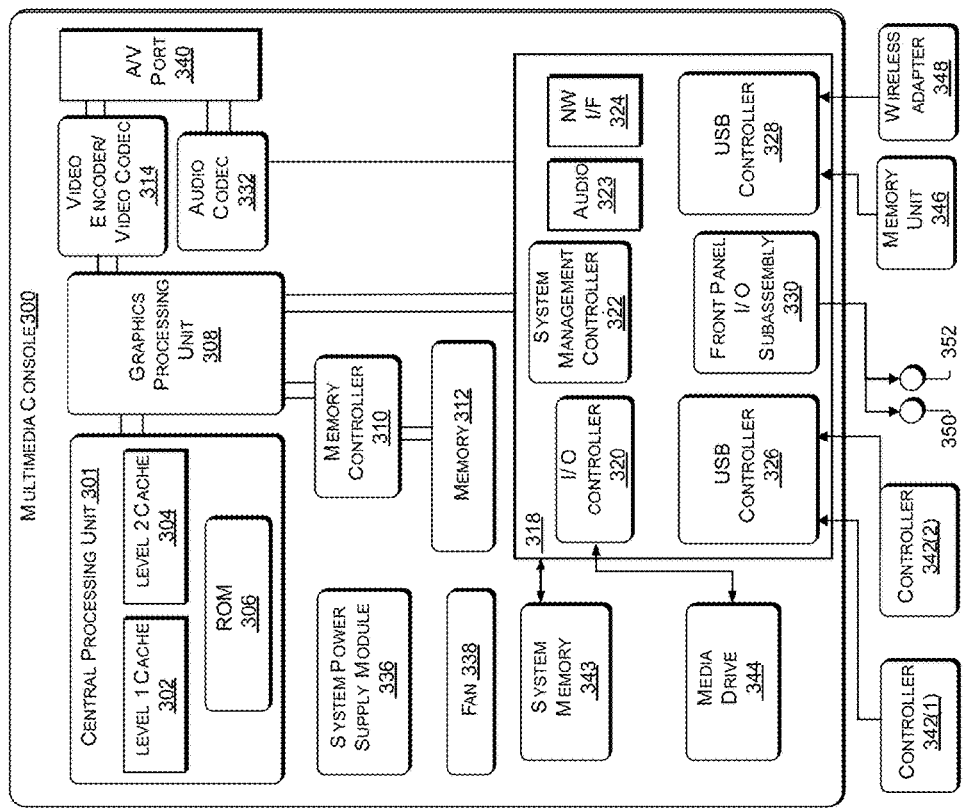
FIG. 3 illustrates an example embodiment of a computing system that may be used to track user behavior and update an application based on the user behavior.

FIG. 3 illustrates an example embodiment of a computing system that may be the computing system 112 shown in FIGS. 1A, 1B and 2 used to track motion and/or animate (or otherwise update) an avatar or other on-screen object displayed by an application. The computing system such as the computing system 112 described above with respect to FIGS. 1A, 1B and 2 may be a multimedia console, such as a gaming console. As shown in FIG. 3, the multimedia console 300 has a central processing unit (CPU) 301 having a level 1 cache 102, a level 2 cache 304, and a flash ROM (Read Only Memory) 306. The level 1 cache 302 and a level 2 cache 304 temporarily store data and hence reduce the number of memory access cycles, thereby improving processing speed and throughput. The CPU 301 may be provided having more than one core, and thus, additional level 1 and level 2 caches 302 and 304. The flash ROM 306 may store executable code that is loaded during an initial phase of a boot process when the multimedia console 300 is powered ON.

A graphics processing unit (GPU) 308 and a video encoder/video codec (coder/decoder) 314 form a video processing pipeline for high speed and high resolution graphics processing. Data is carried from the graphics processing unit 308 to the video encoder/video codec 314 via a bus. The video processing pipeline outputs data to an A/V (audio/video) port 340 for transmission to a television or other display. A memory controller 310 is connected to the GPU 308 to facilitate processor access to various types of memory 312, such as, but not limited to, a RAM (Random Access Memory).

The multimedia console 300 includes an I/O controller 320, a system management controller 322, an audio processing unit 323, a network interface 324, a first USB host controller 326, a second USB controller 328 and a front panel I/O subassembly 330 that are preferably implemented on a module 318. The USB controllers 326 and 328 serve as hosts for peripheral controllers 342(1)-342(2), a wireless adapter 348, and an external memory device 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless adapter components including an Ethernet card, a modem, a Bluetooth module, a cable modem, and the like.

System memory 343 is provided to store application data that is loaded during the boot process. A media drive 344 is provided and may comprise a DVD/CD drive, Blu-Ray drive, hard disk drive, or other removable media drive, etc. The media drive 344 may be internal or external to the multimedia console 300. Application data may be accessed via the media drive 344 for execution, playback, etc. by the multimedia console 300. The media drive 344 is connected to the I/O controller 320 via a bus, such as a Serial ATA bus or other high speed connection (e.g., IEEE 1394).

The system management controller 322 provides a variety of service functions related to assuring availability of the multimedia console 300. The audio processing unit 323 and an audio codec 332 form a corresponding audio processing pipeline with high fidelity and stereo processing. Audio data is carried between the audio processing unit 323 and the audio codec 332 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the multimedia console 300. A system power supply module 336 provides power to the components of the multimedia console 300. A fan 338 cools the circuitry within the multimedia console 300.

The CPU 301, GPU 308, memory controller 310, and various other components within the multimedia console 300 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 300 is powered ON, application data may be loaded from the system memory 343 into memory 312 and/or caches 302, 304 and executed on the CPU 301. The application may present a graphical user interface that provides a consistent user experience when navigating to different media types available on the multimedia console 300. In operation, applications and/or other media contained within the media drive 344 may be launched or played from the media drive 344 to provide additional functionalities to the multimedia console 300.

The multimedia console 300 may be operated as a standalone system by simply connecting the system to a television or other display. In this standalone mode, the multimedia console 300 allows one or more users to interact with the system, watch movies, or listen to music. However, with the integration of broadband connectivity made available through the network interface 324 or the wireless adapter 348, the multimedia console 300 may further be operated as a participant in a larger network community.

When the multimedia console 300 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 Kbps), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 300 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 301 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 342(1) and 342(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 226, 228 and capture device 120 may define additional input devices for the console 300 via USB controller 326 or other interface.

Figure 4:
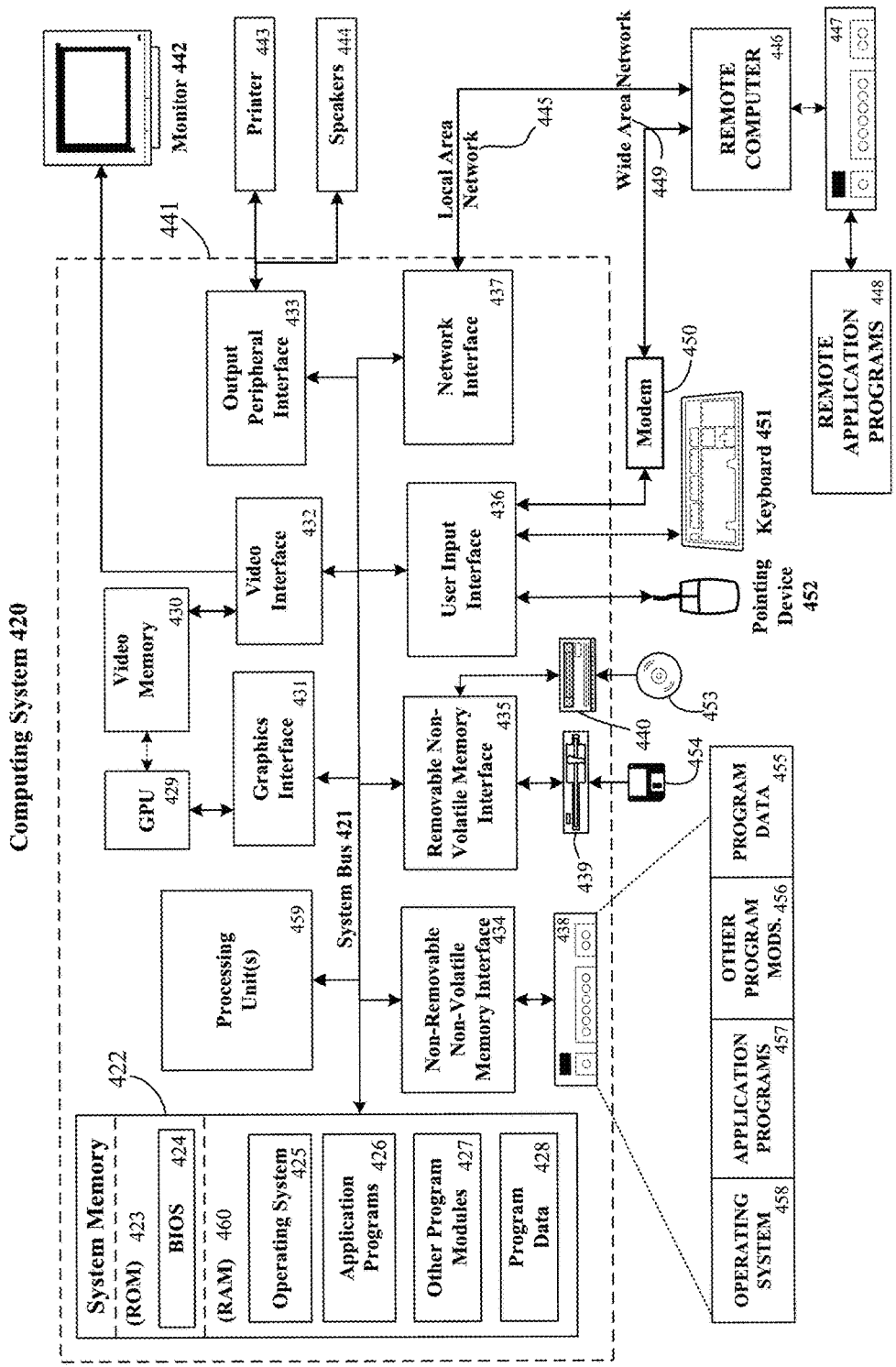
FIG. 4 illustrates another example embodiment of a computing system that may be used to track user behavior and update an application based on the tracked user behavior.

FIG. 4 illustrates another example embodiment of a computing system 420 that may be the computing system 112 shown in FIGS. 1A, 1B and 2 used to track motion and/or animate (or otherwise update) an avatar or other on-screen object displayed by an application. The computing system 420 is only one example of a suitable computing system and is not intended to suggest any limitation as to the scope of use or functionality of the presently disclosed subject matter. Neither should the computing system 420 be interpreted as having any dependency or requirement relating to any one or combination of components illustrated in the exemplary computing system 420. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/ software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 420 comprises a computer 441, which typically includes a variety of computer readable media. Computer readable media can be any available media that can be accessed by computer 441 and includes both volatile and nonvolatile media, removable and non-removable media. The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 4 illustrates operating system 425, application programs 426, other program modules 427, and program data 428.

The computer 441 may also include other removable/non-removable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through an non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). The cameras 226, 228 and capture device 120 may define additional input devices for the computing system 420 that connect via user input interface 436. A monitor 442 or other type of display device is also connected to the system bus 421 via an interface, such as a video interface 432. In addition to the monitor, computers may also include other peripheral output devices such as speakers 444 and printer 443, which may be connected through a output peripheral interface 433. Capture Device 120 may connect to computing system 420 via output peripheral interface 433, network interface 437, or other interface.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been illustrated in FIG. 4. The logical connections depicted include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 4 illustrates application programs 448 as residing on memory device 447. It will be appreciated that the network connections shown are exemplary and other means of establishing a communications link between the computers may be used.

As explained above, the capture device 120 provides RGB images (also known as color images) and depth images to the computing system 112. The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

Project Generation

Certain embodiments of the present technology enable video projects (also referred to herein as audio-visual projects, or simply as projects) to be generated on a segment by segment basis, either through the use of pre-defined templates, or by generating a custom project. Once a project is completed, a user can save the project (or more specifically, a project file) locally and/or upload the project to a remote system that enables the user to share their project with others. A user may also be able to save a project that is incomplete, so that the user can return to the incomplete project at a later time to complete the product.

Figure 5:
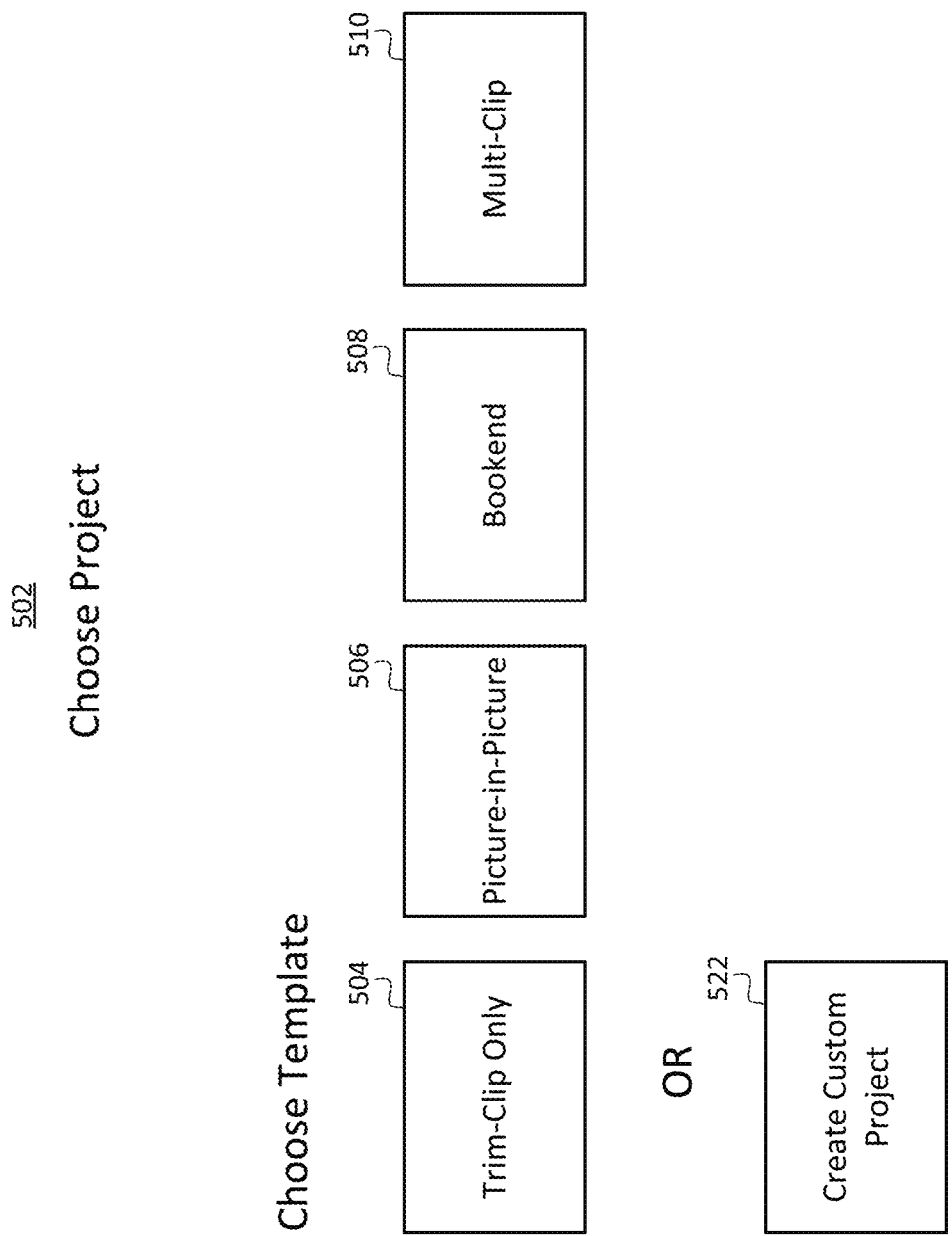
FIG. 5 illustrates an exemplary choose project screen that can be presented to a user to an enable the user to select a project type.

To provide a user with project options, a choose project screen 502 can be presented to the user, as shown in FIG. 5. Referring to FIG. 5, the exemplary template options that are displayed to the user include a "trim-clip only" option 504, a "picture-in-picture" option 506, a "bookend" option 508 and a "multi-clip" option 510. A "create-custom project" option 522 is also shown. Depending upon the computing system being used to present the choose project screen 502 to a user, the user can utilize a game controller, a pointing device (e.g., a mouse, track pad or track ball) or a keyboard to select one of the template options. Where the system can track user motion (e.g., as described above with reference to FIGS. 1A-2), the user may be able to point to a particular option and/or use gestures to select one of the options.

A segment, as the term is used herein, is a temporal portion of a project. Accordingly, a project includes one or more segments. Each segment has an effect applied to it, wherein the effect specifies, among other things, how many and what types of slots (if any) are included in the segment, as well as other properties of the segment, which will be described in additional detail below. The term segment, as used herein, is used to refer to the underlying data that defines a particular temporal portion of a project, as well as to refer to the representation of the segment that is displayed to a user (which may sometimes be referred to as a segment representation, but will often simply be referred to as a segment). The meaning of an instance of the term segment should be apparent from the context of its usage. While every segment has an effect applied to it, it is possible that a segment includes no slots, as will be appreciated from the discussion below.

Each slot is a portion of a segment that can be populated by a clip that is selected or recorded by a user. Accordingly, a segment is analogous to a temporal column, and a slot is analogous to a temporal row, in that there can be one or more rows per column. It is noted that there can be specific types of slots, such as video slots that are meant to be populated by video clips, and audio slots that are meant to be populated by audio clips. The term slot, as used herein, is used to refer to the underlying data that defines a portion of a segment that can be populated by a clip, as well as to refer to the representation of the slot that is displayed to a user (which may sometimes be referred to as a slot representation, but will often simply be referred to as a slot). The meaning of an instance of the term slot should be apparent from the context of its usage.

A clip, as the term is used herein, is a piece of media content that can include, e.g., video data, audio data, text data, static image data and/or other media data. Accordingly, a clip can be any kind of content clip, such as a video clip, an audio clip, a text clip, a static picture clip, or other media clip that can be used to populate a slot. Clips have various different formats, which are well known in the art. For example, a video clip can have an MPEG-1, MPEG-2, MPG-4, 3GP, GIF, WMV, FLV, or AAF format, but is not limited thereto. Audio clips can have, for example, an MP2, MP3, RAW, WAV or WMA format, but is not limited thereto.

An effect, as the term is used herein, refers to one or more properties that can be applied to a segment, wherein each such property can also be referred to as a layer of the effect. In other words, an effect can be made up of one or more layers. Such properties (i.e., layers) can include, a video layout, a transition, an orientation, vertical and horizontal positions, a background, a foreground, a border, an animation in, and animation out, a shadow, an opacity and/or the like. Effects can be stored locally, or can be stored remotely and downloaded in response to a user selecting an icon representing the effect (or selecting some other representation of an effect). Some effects may be available free of charge, while other effects may be available for purchase. Certain effects may be thematic. For example, there may be effects that are intended to be used for producing videos that highlight gameplay for certain video games, such as HALO™, RYSE™, TITANFALL™ and the like. For another example, effects can have holiday or other occasion themes, such as a Thanksgiving, Christmas or New Years themes, or Birthday or Wedding themes.

Different types of video layouts can include, but are not limited to, a full-screen layout, a picture-in-picture layout, a four-window checkerboard layout, a two-window side-by-side layout, and a two-window one above the other layout. Accordingly, the video layout layer of an effect may specify how many video slots are included in a segment, as well as the position and/or orientation of each video window. For examples: a full-screen layout may include a single video slot; a picture-in-picture layout may include two video slots; a four-window checkerboard layout may include four video slots; a two-window side-by-side layout may include two video slots; and a two-window one above the other layout may include two video slots. The author of an effect can decide how many audio slots are most appropriate for a particular layout and design the effect accordingly. A default effect can be a simple effect (e.g., an effect that specifies a full-screen layout) that is by default associated with a segment until the effect for that segment is changed to another effect.

Different types of transitions can include, but are not limited to, fades (e.g., fade to black, or fading of one clip to another), blends, dissolves, as well as more elaborate transitions, such as a flame transition, or a glass shards transition.

A pre-defined template pre-defines the structure of a project, and more specifically, pre-defines how many segments are included in a project, and what effect is applied to each of the segment(s) of the project. In certain embodiments, a user can select from a plurality of pre-defined templates, which enables the user to complete a project from start to finish easily and quickly. Exemplary templates options are shown in FIG. 5, as mentioned above, and are discussed in additional detail below. In accordance with an embodiment, every pre-defined template (which can also be referred to simply as a template) has a pre-defined default skin, which specifies the effect(s) applied to the segment(s) of the template. For example, if a template specifies that a project includes three segments, then the default skin will specify the three different effects that are to be applied to the three different segments. In other words, a skin specifies a separate effect for each separate segment of a template. Accordingly, skin is basically a collection of effects. Thus, a template can be thought of as including one or more segments and a skin that specifies the effect(s) applied to the segment(s).

In accordance with an embodiment, when a user is using a template to generate a project, the user will be provided with the option to change the skin of a template. In accordance with an embodiment, changing the skin of a template will cause the underlying template to change, since a template includes one or more segments and a skin that specifies the effect applied to each of the segment(s). This means that all skins are not necessarily interchangeable. Rather, two skins will be considered interchangeable if they both include the same total number of effects (for application to the same total number of segments), and the effect applied to each separate segment specifies (on a segment by segment basis) includes the same number of each type of slots. Explained another way, a skin is compatible with a project if the skin includes all of the effects for each type of segment in a project. Two skins are interchangeable if they are both compatible with the same project structure. This will be explained in more detail during the discussion of the exemplary templates which are discussed below with reference to FIGS. 8 and 9.

The type of an effect is generally defined by the number and types of slots, and potentially slot duration limitations (e.g., minimum, maximum, variable or fixed durations). Accordingly, the type of a segment can be indirectly defined by the type of the effect currently applied to it. For example, an effect with two video slots can generally be interchanged with another effect with two video slots. When changing effects of the same type (or same signature), clips selected or recorded by a user to populate those slots remain in the segment and are simply affected differently in accordance with the new effect. Two effects are not directly compatible (i.e., interchangeable) if they have a different number and/or types of slots, in which case some reinterpretation may be required, such as maybe removing clips from the segment which cannot be remapped to a slot defined by the new effect. A skin, as mentioned above, is basically a collection of effects. If the effects currently applied to the different segments in a project can be changed to the effects defined by some other collection of effects, as specified by a skin, then that skin is compatible with the project, and thus indirectly compatible with whatever skin was previously applied to that project.

Certain skins may be thematic. For example, there may be a skin that is intended to be used when producing a project that includes highlights and a voiceover of a particular video game, such as HALO™, in which case the game's logo, characters and over-all look may be part of the final project. For a more specific example, the game's logo may be used as part of an intro, and a game character may be used during a transition from one segment to another. For other examples, skins may have themes that relate to holidays or other occasions. In accordance with an embodiment, when a user is provided with an option to change a skin, only those skin options that are interchangeable with the current skin (e.g., the default skin) are presented to the user.

Figure 6:
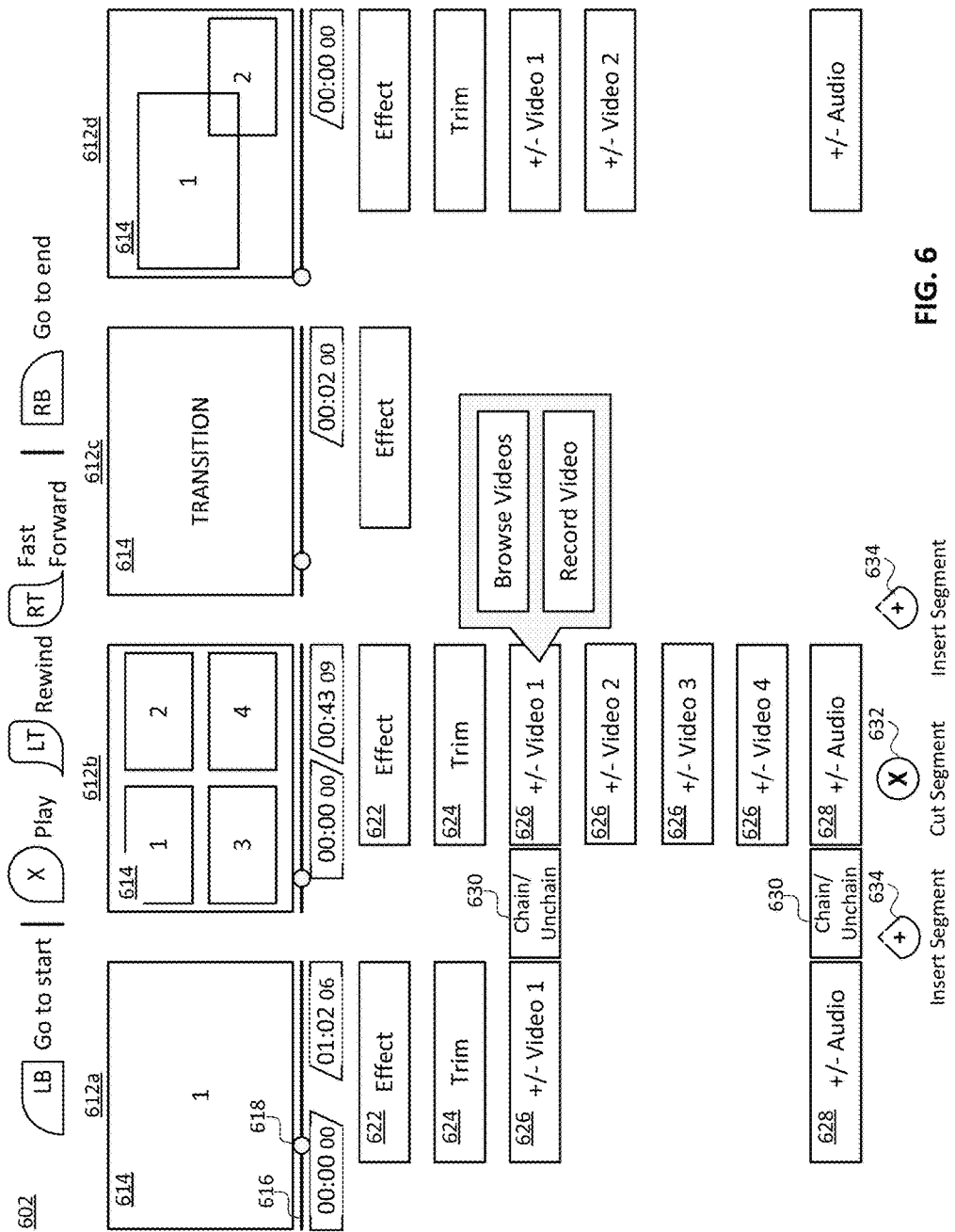
FIG. 6 illustrates an exemplary custom project screen that can be presented to a user to enable the user to generate a custom project.

A custom project screen 602, shown in FIG. 6, will now be used to further explain the various terms introduced above, as well as to explain how a user can generate a custom project. The custom project screen 602 may be presented to a user in response to the user selecting the "create custom project" icon 522 from the choose project screen 502 shown in FIG. 5. Referring to FIG. 6, four segments labeled 612a, 612b, 612c and 616d (which can collectively be referenced as the segments 612) are represented that correspond to four temporal portions of the project. In accordance with an embodiment, when the custom project screen 602 is initially presented, a single segment may be shown, and the user can select the "insert segment" icon 634 to add an additional segment at a desired temporal position. Alternatively, after the "create custom project" icon 522 is selected by the user, a screen may be presented to the user that asks the user how many segments are to be included in the project. Either way, once presented with the custom project screen 602, the user will be able to cut segments, or insert segments, as desired, by selecting the appropriate icons 632 and 634. The cut segment icon 632 and insert segment icon 634 can also be used to change the order the various segments 612.

Still referring to the segment 612a in FIG. 6, the segment 612a is shown as including a preview window 614, below which is a scrub bar 616 and a playhead 618. The scrub bar 616 represents a time line of a clip that is being played and the playhead 618 indicates a portion of the clip that is being played. The preview window 614 enables the user to preview the segment 612a, so that it can be edited by the user. The other segments 612 can similarly include a scrub bar and playhead.

The segment 612a is also shown as including an effect icon 622, a trim icon 624, a video icon 626 and an audio icon 628, each of which can additionally or alternatively include a graphical representation of each icon. For example, the audio icon 628 can include a microphone graphic in addition to, or instead of, the word "audio". For another example, the video icon 628 can include a film canister or perforated film graphic in addition to, or instead of, the word "video". The video icon 626 is a visual representation of a video slot of the segment 612a, and the audio icon 628 is a visual representation of an audio slot of the segment. Where a segment includes multiple video slots, as is the case with the segment 612b, multiple video icons 626 will be displayed (i.e., one video icon for each video slot). Similarly, where a segment includes multiple audio slots, multiple audio icons 628 will be displayed (i.e., one audio icon for each audio slot).

In response to the user selecting the effect icon 622, a list of effect options can be presented to the user to thereby enable the user to select an effect that is to be applied to the segment. The effects, from which the user may select, can be stored locally or remotely (e.g., in on cloud servers) and downloaded once selected. Every segment can have a default effect, e.g., which specifies a full-screen video layout, so that even if a user does not select an effect to apply to a segment, that segment will still have an effect associated with it and applied to it.

In accordance with an embodiment, when the user selects the effect icon 622, a textual list of possible effects can be presented to the user. Alternatively, another screen that visually and/or textually describes various different selectable effects can be presented to the user to better illustrate to the user the properties of each effect. Then, after the user selects one of the effects to be applied to a segment, there is a return to the custom project screen 602, at which point the overall look and feel of the preview window (e.g., 614) will correspond to the effect selected. For example, in FIG. 6, the effect selected for the segment 612a specifies a full-screen layout, the effect selected for the segment 612b specifies a four-window checkerboard layout, the effect selected for the segment 612c specifies a transition, and the effect selected for the segment 612d specifies a picture-in-picture layout.

The number of video icons 626 presented for each of the segments 612 will depend on the video layout associated with (e.g., the video layout layer of) the effect selected for the segment. For example, since the effect selected for the segment 612a specifies a full-screen layout, a single video icon 626 is presented for segment 612a. For another example, since the effect selected for the segment 612b specifies a four-window checkerboard layout, four video icons 626 are presented for the segment 612b to thereby enable the user to select a separate video clip for each of the four windows, and more specifically, for each of four video slots. The segment 612c is an example of a segment having an effect applied to it that does not specify any video or audio slots, but rather, only specifies a transition, examples of which were discussed above. Since the effect selected for the segment 612d specifies a picture-in-picture layout, two video icons 626 are presented for the segment 612d to thereby enable the user to select a separate video clip for each of the two picture-in-picture windows, and more specifically, for each of two video slots.

Figure 7:
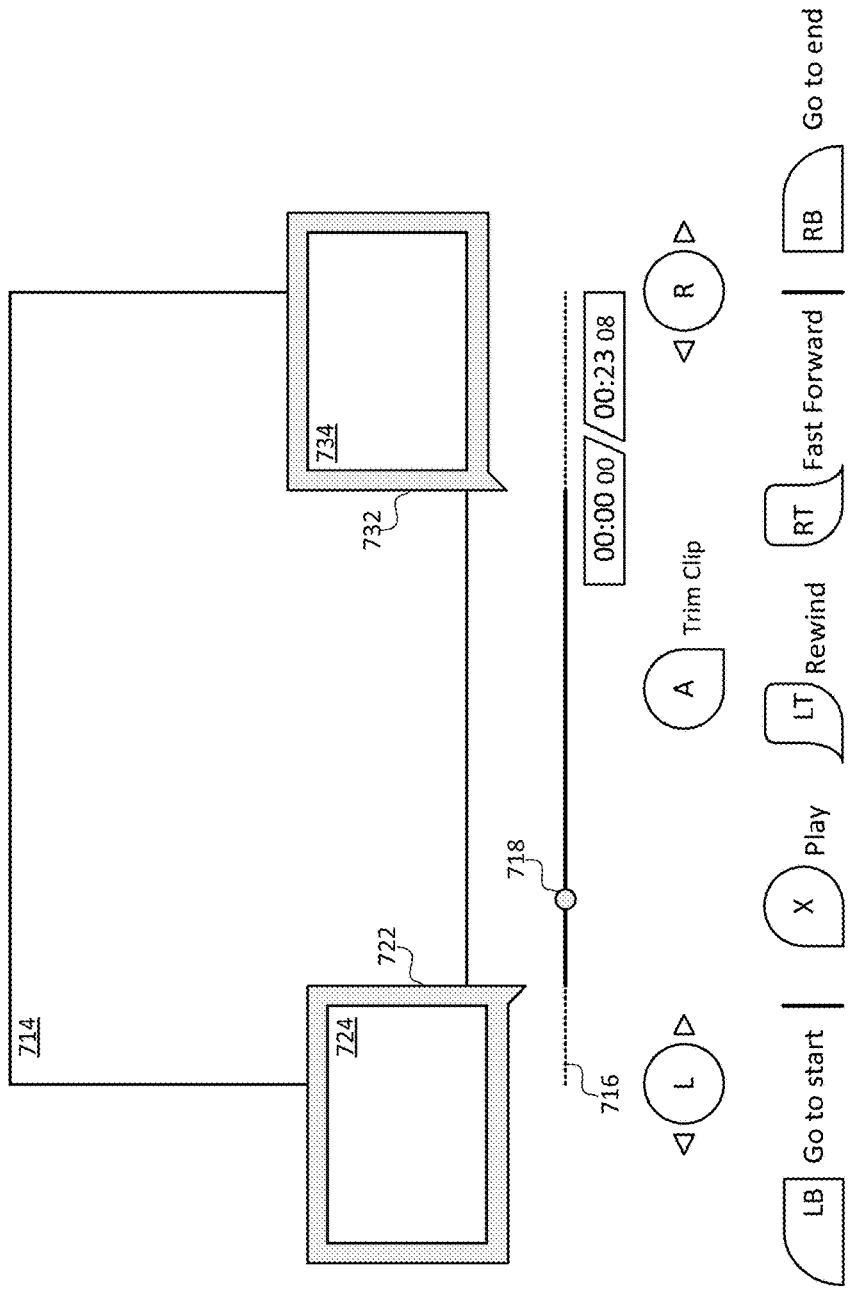
FIG. 7 illustrates an exemplary trim screen that can be presented to a user to enable the user to trim clips that are used in a project.

In response to the user selecting the trim icon 624, the trim screen 702 shown in FIG. 7 will be presented to the user. As will be discussed in more detail below with reference to FIG. 7, a user can use the same trim screen to trim each of the clips that populates each of the slots in a segment by navigating up and down to select which slot is to have its clip trimmed. Trim operations could be used to specify the start of each clip populating each slot and to change the duration of the whole segment shared between the slots by specifying an end of each clip populating the slots of a segment.

In response to the user selecting one of the video icons 626, the user will be given an option to browse videos or record a video. If the user selects the browse video option, a list of pre-recorded video clips will be presented to the user, from which the user can select a video clip. The pre-recorded video clips can be stored locally or remotely (e.g., on cloud servers) and downloaded once selected. If the user selects the record video option, then the user will be able to use a camera (e.g., the RGB camera 228 of the capture device 120 discussed with reference to FIG. 2) to record a video clip that will populate the video slot represented by the video icon 626. Once a video clip has already been added into a video slot of a segment, the user will thereafter have the options of clearing the video slot, populating the video slot with a different video clip, and trimming the clip.

In response to the user selecting the audio icon 628, the user will be given an option to browse audio clips or record an audio clip. If the user selects the browse audio clips, a list of pre-recorded audio clips will be presented to the user, from which the user can select an audio clip. The pre-recorded audio clips can be stored locally or remotely (e.g., on cloud servers) and downloaded once selected. If the user selects the record audio option, then the user will be able to use a microphone (e.g., the microphone 230 of the capture device 120 discussed with reference to FIG. 2) to record an audio clip that will populate the audio slot represented by the audio icon 628. For example, the user may record a voiceover type of audio clip while a video is being played within one of the preview screens 614.

Still referring to FIG. 6, where there is at least one video slot in each segment of an adjacent pair of segments, an option to chain together video slots in the adjacent segments will be presented using a chain icon 630. Similarly, where there is at least one audio slot in each segment of an adjacent pair of segments, an option to chain together audio slots in the adjacent segments will be presented using the chain icon 630. When slots are chained together, the result is an elongated slot that spans multiple segments (e.g., segments 612a and 612b). Accordingly, chaining together slots is somewhat analogous to merging together cells of a row in a multi-column table so that a resulting elongated cell may span more than one column of the table. So long as neighboring segments include a same type of slot, those slots can be chained together. This means that slots in even more than two segments can be chained together so that a slot can span even more than two segments, if so desired. The icon 630 (or a separate "unchain" icon) can be used to unchain previously chained together slots, which is somewhat analogous to unmerging previously merged together cells of a row in a multi-column table. In an embodiment, when slots of the same type in adjacent segments are not chained together, the icon 630 will display to the user the option to chain together the slots; and when slots of the same type in adjacent segments are already chained together, the icon 630 will display to the user the option to unchain the slots.

In accordance with an embodiment, slots in adjacent segments can only be chained together if they are of the same type, e.g., if they are both video slots or both audio slots. In accordance with another embodiment, slots in adjacent segments can be chained together regardless of their type, e.g., a video slot can be chained together with an audio slot. Where different types of slots are chained together, the type of a slot (that is populated by a user selected or recorded clip) will affect the project. For example, assume a video slot in a first segment is chained together with an audio slot in a second segment, and also assume that a user populated the chained together pair of slots with a video clip. When the first segment is played, the audio and video content of a portion of the video clip will be presented. However, when the second segment is played, only the audio content of a further portion of the video clip will be presented, since the underlying slot of the segment (that is populated by the portion of the video clip) is actually an audio slot. More generally, when a video clip is selected or recorded by a user to populate an audio slot, only the audio content of the video clip is presented when the segment including that audio slot is being presented. Conversely, if an audio clip is selected or recorded by a user to populate a video slot, only the audio content of the video clip is presented when the segment including that audio slot is being presented. This can result in an empty window (corresponding to the video slot) being presented when the segment including the video slot is presented, or alternatively, default graphics, or the like, can be presented where there is no video content associated with a video slot.

The specific segment 612 that is navigated to by the user, e.g., using a game controller or some other device that moves a cursor or pointer, can be highlighted (i.e., emphasized) in some way so that the user knows on which segment they are currently operating, while the other segments can be deemphasized. For example, the segment that the user has navigated to may appear larger, brighter and/or in a different color than the other segments displayed to the user. In an embodiment, the cut and insert segment icons 632 and 634 only appear for the segment 612 to which the user has navigated. For example, if a user has navigated to the segment 612b, then the cut and insert icons 632 and 634 can displayed to enable the user to cut the segment 612b, add (i.e., insert) a segment before the segment 612b (i.e., between the segments 612a and 612b), and add (i.e., insert) a segment after the segment 612b (i.e., between the segments 612b and 612c). In another embodiment, the cut and insert icons can 632 and 634 always appear for every segment of the project.

In an embodiment, a representation of every segment 612 of a project is always displayed to the user. In another embodiment, there are a maximum number of segments representations that can be displayed to the user at a time, in which case, the segment representations can be scrolled through from left to right, and vice-versa, by the user. In this latter embodiment, it may be that the segment to which the user has navigated is displayed in the center of the screen.

In accordance with an embodiment, presented navigations icons (e.g., the icons labeled LB, X, LT, RT and RB) correspond to buttons of a game controller for the computing system (e.g., a gaming console) that is being used to generate the project. For example, in FIG. 6 and many of the other FIGS., the LB icon can correspond to a left bumper button, the LT icon can correspond to a left-trigger button, the RT icon can correspond to the right-trigger button, the RB icon can correspond to the right bumper button, and the X icon can correspond to an X button. Such navigations icons can enable a user to go to the start of the project, which is the beginning of the first segment of the project, or go to the end of the project, with is the ending of the last segment of the project. Additionally, the navigations icons can enable the user to rewind or fast-forward through a project. Such navigation icons or other navigations controls will, for example, enable a user to readily navigate to a portion of the project that they want to preview and/or edit. Preferably, the user will be able to adjust how fast or slow they rewind or fast-forward, e.g., by adjusting how firmly they press a trigger type button (e.g., LT and RT), or in some other manner. Alternative navigations icons that can be presented to provide the just described navigation functions, e.g., where a different game controller is used with the system being used to generate the project, or where a different input device, such as a mouse or keyboard, is employed.

Reference will now be made to the trim-clip screen 702 in FIG. 7, which will be displayed in response to a user selecting one of the trim icons 624 shown in FIG. 6. Referring to FIG. 7, the trim-clip screen 702 includes a main preview window 714, a scrub bar 716 and a playhead 718. A start handle 722 can be moved left and right to specify the starting point of a clip, and an end handle 732 can be moved left and right to specify the ending point of a clip. In accordance with an embodiment shown in FIG. 7, the start handle 722 includes a start preview window 724 that shows the starting frame of the clip, and the end handle 732 includes an end preview window 734 that shows the ending frame of a clip. Where the clip being trimmed is a video clip, portions of the video clip will appear in the preview windows 714, 724 and 734. Where the clip being trimmed is an audio clip, a similar graphical user interface that is more appropriate for audio clips can be presented to the user. Left, right and trim icons (labeled, L, R and A) can be used to move the handles 722 and 732 and select the points at which the clip is to be trimmed.

Figure 8:
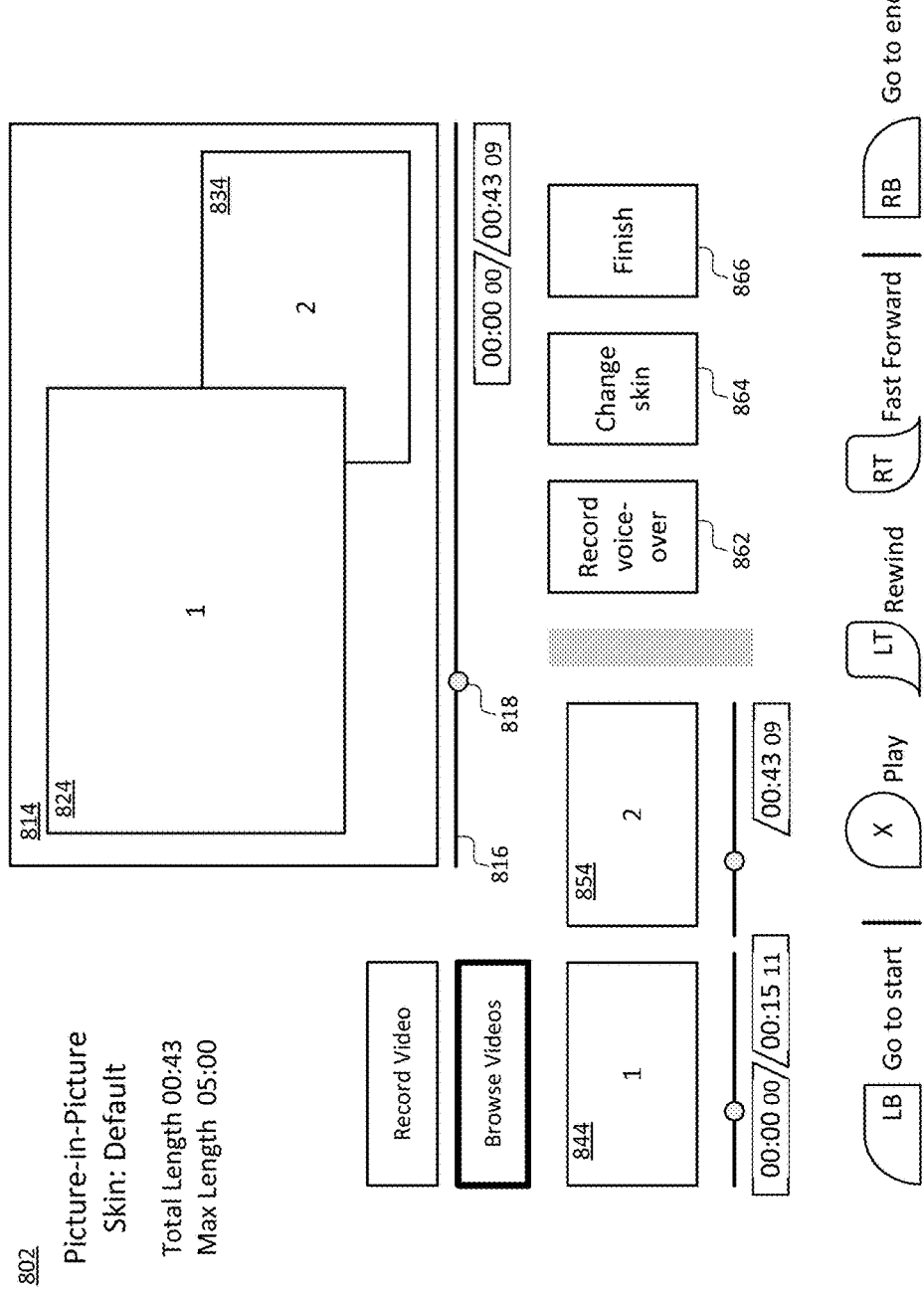
FIGS. 8 and 9 illustrate exemplary template screens that can be presented to a user to enable the user to generate projects using predefined templates.
Figure 9:
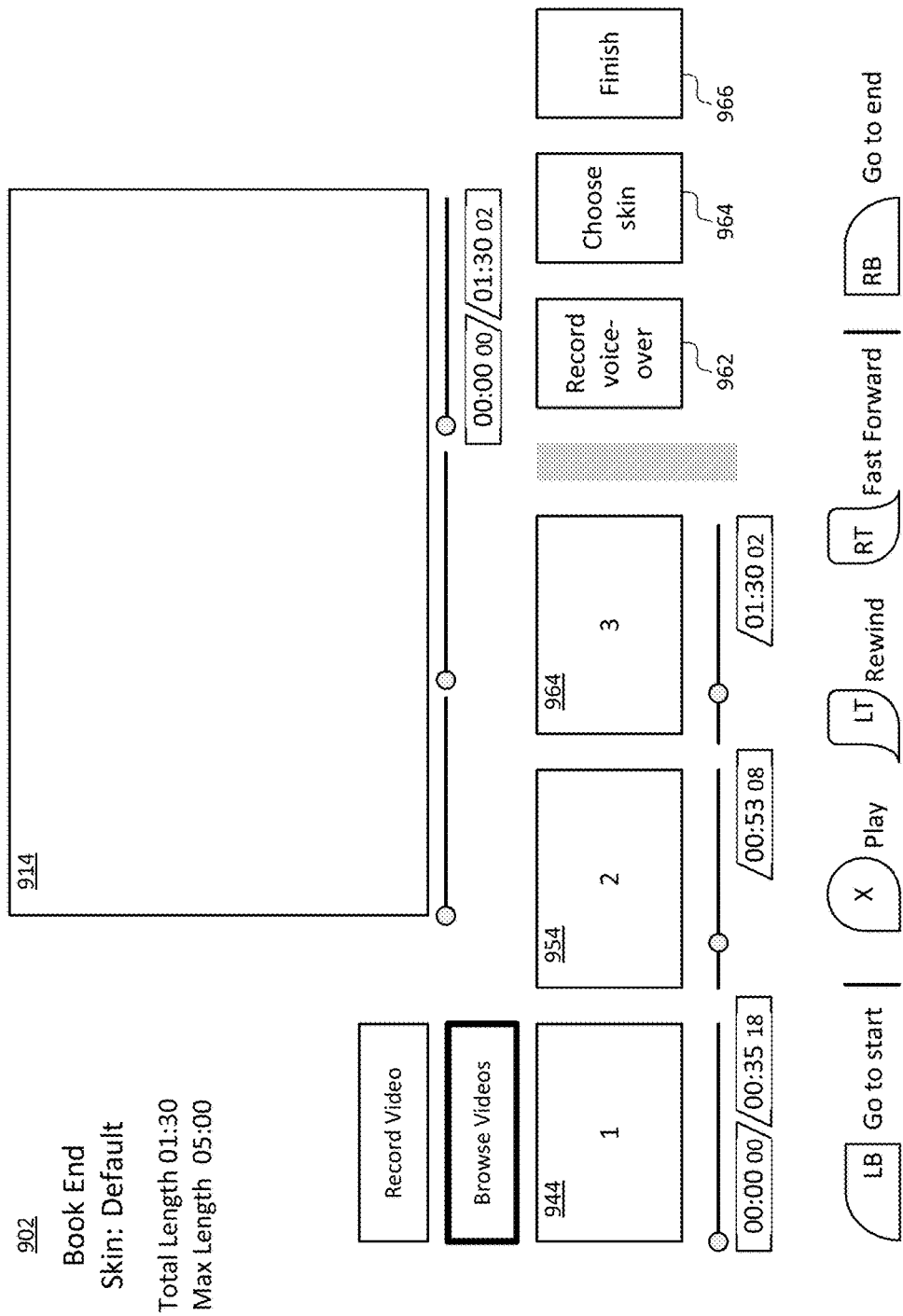

FIGS. 8 and 9 will now be used to describe how projects can be generated using pre-defined templates. As mentioned above in the discussion of FIG. 5, exemplary template options that may be displayed to the user include a "trim-clip only" option, a "picture-in-picture" option a "bookend" option and a "multi-clip" option, but are certainly not limited thereto. FIG. 8 illustrates an example of the screen that may be displayed if the user selected the "picture-in-picture" template option 506. FIG. 9 illustrates an example of the screen that may be displayed if the user selected the "bookend" template option 506. While not described herein, if the user selects one of the other template options, a corresponding template screen will be presented to the user. Various alternative and/or additional templates can also be available.

Referring to FIG. 8, a picture-in-picture template screen 802 illustrated therein includes a preview window 814 (that includes a first picture window 824 and a second picture window 834), a scrub bar 816 and a playhead 818. This exemplary template includes a single segment that is editable by the user (i.e., a single user editable template), wherein the video layout layer of the effect applied to the segment is a picture-in-picture layout. Accordingly, the user editable segment will include two video slots, pictorially represented by slot representation windows 844 and 854. The effect applied to the segment may also specify an orientation, vertical and horizontal positions for the windows 824 and 834, a background, a foreground, a border, an animation in, and animation out, a shadow, an opacity and/or the like. Each of the slot representation windows 844 and 854 includes its own scrub bar and playhead, wherein the two payheads will move in unison in this example (since clips in the two slots will play simultaneously). When the user navigates to the slot representation window 844, the user is presented with the options to record a video, or browse videos, which options are similar to those discussed above with reference to FIG. 6. Once a slot representation window is populated with a video clip, the user will also be given the option to trim the clip, at which point they will be brought to the trim-clip screen 702 described above with reference to FIG. 7. This particular template enables a user to record an audio clip for the segment by selecting the "record voice-over" icon 862. There may also be one or more pre-defined audio clips that an author of the skin chose to populate with one or more audio clips that is/are not modifiable by the user. The user can preview their project by pressing the play icon, in response to which previews will be displayed in the windows 824 and 834 of the large preview window 814, as well as in the slot representation windows 844 and 854.

While the picture-in-picture template may include only a single user editable segment, the template may include one or more other segments that were pre-defined by the template author. For example, there may be a segment prior to the user editable segment that includes an intro and a transition, and/or there may be a segment following the user editable segment that includes a transition and an outro. These are just a few examples, which are not meant to be limiting.

The picture-in-picture template screen 802 is also shown as including a change-skin icon 864. If the user selects the change-skin icon 864 (which can alternatively be referred to as a select-skin icon), the user will be presented with other skins that are interchangeable with the default skin for the picture-in-picture template. Such other skins would similarly include the same number of segment(s), with a user editable segment including two video slots as well as an audio slot what can be populated with a voice-over audio clip. This would give the user the option change the overall look and feel of their project, simply by changing the skin, even after the user has populated the video slots with video clips and recorded a voice-over audio clip.

The picture-in-picture template screen 802 is also shown as including a finish icon 866, which enables the user to indicate when they have completed with the project. When the finish icon 866 is selected, the user may be presented with multiple different options as to where they want to save their project and/or with whom they want to share their project. Alternatively, there can be a default storage location where projects (and more specifically, project files) are saved. Once a project is finished and saved the user, or some other user, can retrieve the project and play the project, which results in the project to being presented.

FIG. 9 illustrates an exemplary bookend template screen 902, which includes three user editable segments each of which has an effect that specifies that the video layout for each of the three user editable segments includes a single window. Accordingly, each segment will include a single slot, pictorially represented by slot representation windows 944, 954 and 964. The effect of each segment may also specify a background, a foreground, a border, an animation in, and animation out, a shadow, an opacity, window position, window size, window orientation, and/or the like. Each of the windows slot representation windows 944, 954 and 964 includes its own scrub bar and playhead, as does a main preview window 914. When the user navigates to one of the slot representation windows 944, 954 and 964 they are presented with the options to record a video, or browse videos, which options are similar to those discussed above with reference to FIG. 6. Once a slot is populated with a video clip, the user will also be given the option to trim the clip, at which point they will be brought to the trim-clip screen 702 described above with reference to FIG. 7. This template enables a user to record their own audio clip that spans the three segments by selecting the "record voice-over" icon 962. This means that audio slots for the three templates have been chained together by the template author. The user is also presented with a change skin icon 964 and a finish icon 966, which functions are the same as the same named icons discussed above with reference to FIG. 8. The user can preview their project by selecting the play icon. If the user choses to go to the start before selecting the play option, the video clip included in the first segment will be previewed in windows 944 and 914. When that video clip included in the first segment ends, the video clip included in the second segment will be previewed in the widows 954 and 914. When that video clip included in the second segment ends, the video clip included in the third segment will be previewed in the widows 964 and 914. If the author of the skin included non-editable segments between the three editable segments, then the contents of those segments (e.g., transitions) will also be displayed at the appropriate points in the time during the previewing of the project in the main preview window 914.

Each of the other pre-defined templates will have a corresponding template screen that is presented when the template is selected. In accordance with an embodiment, each template has a default skin applied to the template. As explained above, the user may have the option to change the skin from the default skin another skin that is interchangeable with the default skin. Alternatively, in response to a user selecting a template option, the user may be presented with a list of skins that can be applied to that template prior to the user being presented with the template screen. Then, once the user selects a skin to be applied to the template, the user can be presented with the template screen, and the template screen may have a look and feel that is dependent on the skin selected. Application of a skin to a template may also be referred to as skinning the template.

Figure 10:
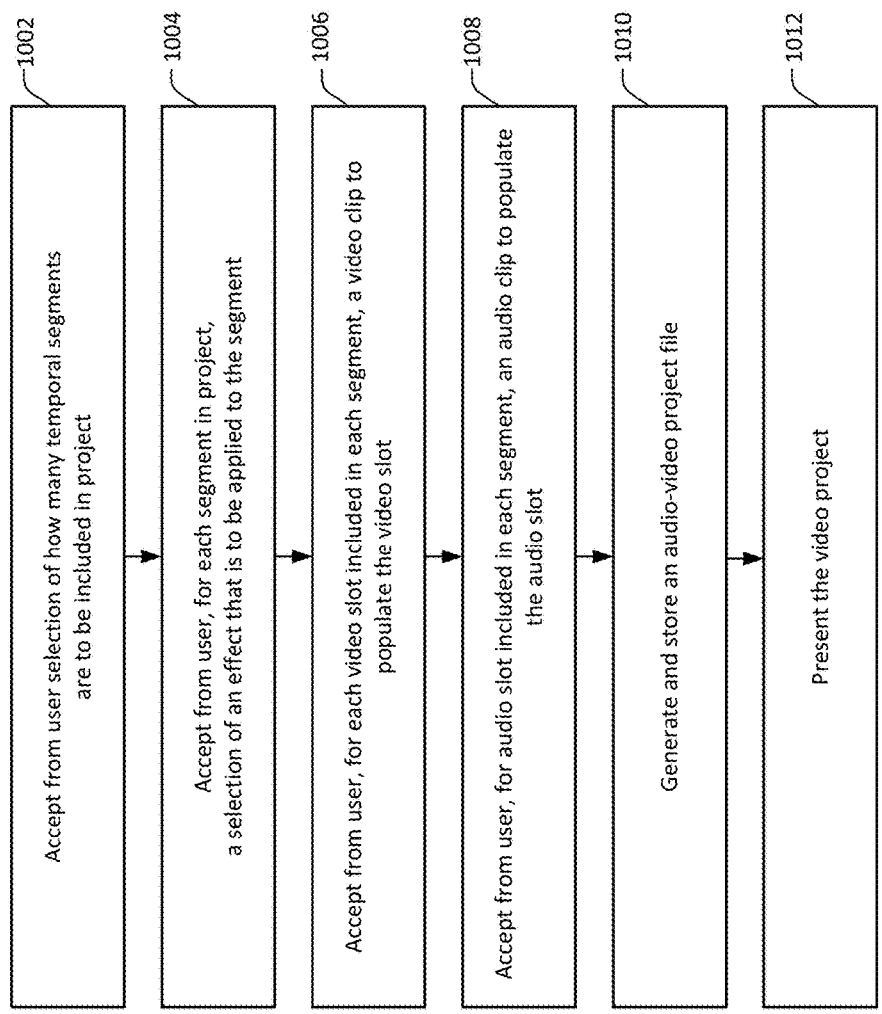
FIG. 10 is a high level flow diagram that is used to summarize methods for generating a custom project.

The high level flow diagram of FIG. 10 will now be used to summarize methods for enabling a user to generate a custom project in accordance with certain embodiments of the present technology. Referring to FIG. 10, at step 1002, a selection of how many temporal segments are to be included in the project is accepted from the user. Exemplary details of this step were discussed above with reference to FIG. 6. For example, when the custom project screen 602 (in FIG. 6) is initially presented to a user, a single segment may be shown, and the user can select the "insert segment" icon 634 to add one or more additional segments at one or more desired temporal positions. Alternatively, after the "create custom project" icon 522 (in FIG. 5) is selected by the user, a screen may be displayed to the user that asks the user how many segments are to be included in the project. Either way, once presented with the custom project screen 602, the user will be able to remove and add segments as desired, as well as change the order of the various segments.

Referring again to FIG. 10, at step 1004, for each segment in the project, a selection of an effect that is to be applied to the segment is accepted from the user. As explained above, the selected effect will specify how many video slots are included in the segment and how many audio slots are included in the segment. For example, if an effect selected for a segment specifies a full-screen layout, then that segment will include a single slot; or if an effect selected for a segment specifies a four-window checkerboard layout, then that segment will include four video slots. Each effect can specify one or more additional property, such as, but not limited to: an intro, an outro, static graphics, moving graphics, a transition, an opacity, a background, a foreground, a border, a cut-scene video, window position, window size, window orientation, and/or a post processing procedure. A post processing procedure can, for example, cause a video clip to have a particular look, such as a black-and-white film noir look, a grainy look, a vignet look, a night-vision look, a posterized look, but is not limited thereto. As was explained above with reference to the segment 612c in FIG. 6, it is possible that a segment includes no audio slot and/or no video slot, e.g., a segment can simply include one or more of the other aforementioned properties, such as a transition.

Still referring to FIG. 10, at step 1006, for each video slot included in each segment, a selection of a video clip to populate the video slot is accepted from the user. This can include, for each video slot, providing the user with both an option to record a video clip for inclusion in the video slot, and an option to select a pre-recorded video clip for inclusion in the video slot, as was explained above with reference to FIG. 6. As was also explained in additional detail above with reference to FIG. 6, the method can also include chaining together video slots that are included in adjacent segments in response to accepting an indication from the user that the video slots are to be chained together, which enables a video clip to span more than one of the segments. Additionally, as was explained above with reference to FIG. 7, for each video clip selected by the user to be included a video slot, the user can trim the video clip such that only a portion of the video clip is played when the project is played.

At step 1008, for each audio slot included in each segment, a selection of an audio clip to populate the audio slot is accepted from the user. This can include, for each audio slot, providing the user with both an option to record an audio clip for inclusion in the audio slot, and an option to select a pre-recorded audio clip for inclusion in the audio slot, as was explained above with reference to FIG. 6. As was also explained in additional detail above with reference to FIG. 6, the method can also include chaining together audio slots that are included in adjacent segments in response to accepting an indication from the user that the audio slots are to be chained together, which enables an audio clip to span more than one of the segments. Additionally, as was explained above, for each audio clip selected by the user to be included an audio slot, the user can trim the audio clip such that only a portion of the audio clip is played when the project is played.

At step 1010, an audio-video project file is generated and stored (on one or more computer readable storage devices that are local to the user or remote from the user) that is based on the how many segments are included in the project, how many video and audio slots are included in each segment, the video clips that populate video slots, and the audio clips that populate the audio slots. The saved project file will also be based on other properties of the effect(s) applied to the segment(s) of the project. For example, the project file may also have an intro, one or more transitions, and an outro that are defined by effects applied to segments of the project. The project file can have, for example, an MPEG-1, MPEG-2, MPG-4, 3GP, GIF, WMV, FLV, or AAF format, but is not limited thereto. The same software application that is used to perform steps 1002-1008 can also be used to perform step 1010 using, e.g., compiling algorithms, rendering algorithms, and/or the like.

At step 1012, the project is presented to the user or some other person that chose to play the saved video project file. The project can be presented by playing the project file using a computing device that includes an audiovisual device (e.g., 116 in FIGS. 1A and 1B) that includes a display and an audio transducer (e.g., a speaker).

Figure 11:
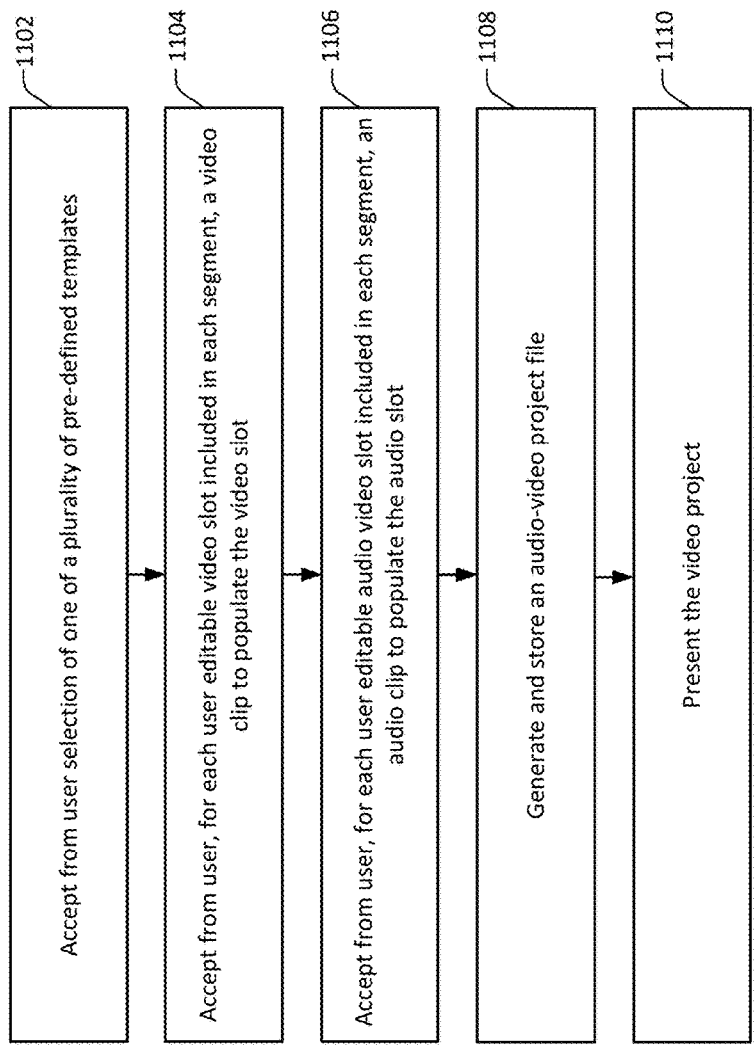
FIG. 11 is a high level flow diagram that is used to summarize methods for generating a project using a predefined template.

The high level flow diagram of FIG. 11 will now be used to summarize methods for enabling a user to generate a project using pre-defined templates in accordance with certain embodiments of the present technology. Referring to FIG. 11, at step 1102 a selection of one of the plurality of pre-defined templates is selected from a user. Exemplary predefined templates were discussed above with reference to FIGS. 5, 8 and 9. As was explained above, each of the templates specifies how many segments are included in a project generated using the template. Additionally, a skin that is applied to the selected template specifies a separate effect that is to be applied to each separate segment of the project. Such a skin can be a default skin for the template, or may be a user selected skin that is compatible with the template. The effect for each segment of the project specifies how many video slots are included in the segment, how many audio slots are included in the segment, and at least one other property of the segment, such as, but not limited to: an intro, an outro, static graphics, moving graphics, a transition, an opacity, a background, a foreground, a border, a cut-scene video and/or a post processing procedure.

At step 1104, for each video slot included in each segment of the selected template, a selection of a video clip to populate the video slot is accepted from the user. This can include, for each video slot, providing the user with both an option to record a video clip for inclusion in the video slot, and an option to select a pre-recorded video clip for inclusion in the video slot.

At step 1106, for each audio slot included in each segment of the selected template, a selection of an audio clip to populate the audio slot is accepted from the user. This can include, for each audio slot, providing the user with both an option to record an audio clip for inclusion in the audio slot, and an option to select a pre-recorded audio clip for inclusion in the audio slot.

At step 1108, an audio-video project file is generated and stored (on one or more computer readable storage devices that are local to the user or remote from the user) that is based on the how many segments are specified by the selected template (are thus, are included in the project), the video clips that populate video slots, and the audio clips that populate the audio slots, and the other properties the or more effects (specified by the skin) that are applied to the one or more segments of the project. The saved project file will also be based on other properties of the effect(s) applied to the segment(s) of the project. For example, the project file may also have an intro, one or more transitions, and an outro that are defined by effects applied to segments of the project. The project file can have, for example, an MPEG-1, MPEG-2, MPG-4, 3GP, GIF, WMV, FLV, or AAF format, but is not limited thereto. The same software application that is used to perform steps 1102-1106 can also be used to perform step 1108 using, e.g., compiling algorithms, rendering algorithms, and/or the like.

At step 1110, the project is presented to the user or some other person that chose to play the saved video project file. The project can be presented by playing the project file using a computing device that includes a display and an audio transducer (e.g., a speaker).

Figure 12:
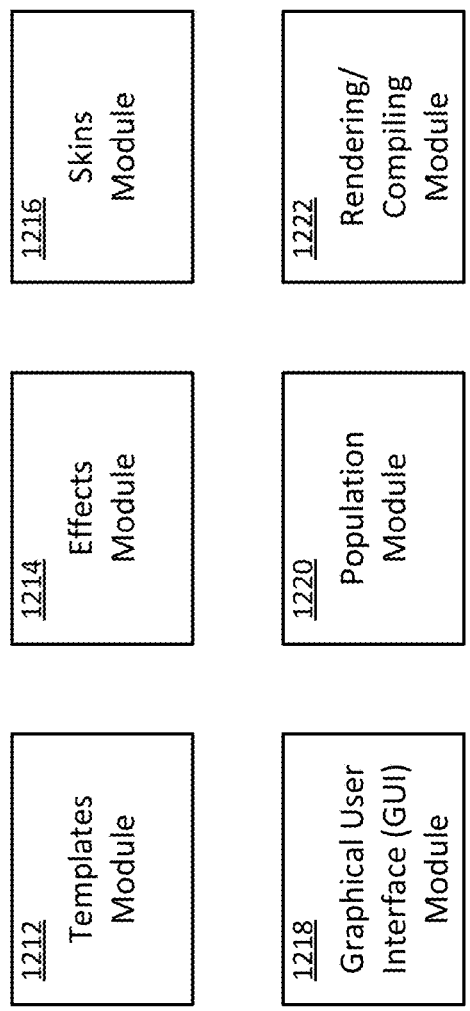
FIG. 12 illustrates exemplary modules that may be used to implement embodiments described herein.

Exemplary modules that can be used to implemented embodiments described above will now be discussed with reference to FIG. 12. Referring to FIG. 12, a templates module 1212 can be used by a template author to generate templates that can thereafter to available to users that want to generate audio-visual projects easily and quickly. The templates module 1212, or a separate templates store module, may store the templates that are available to users. An effects module 1214 can be used by an effects author to generate effects that can thereafter to available to users to apply to segments of projects. The effects module 1214, or a separate effects store module, may store the effects that are available to users. A skins module 1216 can be used by a skin author to generate skins that can thereafter to available to users to apply to templates. The skins module 1216, or a separate skins store module, may store the skins that are available to users. A graphical user interface (GUI) module 1218 can be used to produce the various screens that are presented to a user generating a project, as well as to accept selections and other inputs from a user. A population module 1220 can be used to populate slots of segments with clips that are selected, e.g., by a template author, an effect author, or a user generating a project. A rendering and/or compiling module 1222 can be used to produce a project file, based on the one or more segments, clips, effects, etc., that are associated with a project. Each of the aforementioned modules can be software program modules stored on one or more computer readable storage devices, e.g., in memory. Such modules can be executed using one or more processors of a computing system, examples of which were discussed above with reference to FIGS. 3 and 4. More generally, each module can be implemented by one or more processor (of a computing system) executing program code. Such a computing system can also include an audiovisual device (e.g., 116 in FIGS. 1A and 1B) that enables the graphical user interface to be presented to the user, and also enables the project to be presented to the user when a project file is played.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the present technology. For example, it would be possible to combine or separate some of the steps shown in FIGS. 10 and 11. For another example, it is possible to change the boundaries of some of the blocks shown in FIGS. 3, 4 and 12.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. One or more processor readable storage devices having instructions encoded thereon which when executed cause one or more processors to perform a method for enabling a user to generate an audio-visual project, the method comprising:
   accepting from the user a selection of how many temporal segments are to be included in the project;
   accepting from the user, for each segment in the project, a selection of an effect that is to be applied to the segment, wherein the selected effect specifies how many video slots are included in the segment and how many audio slots are included in the segment;
   accepting an indication from the user that selected ones of the video or audio slots that are included in adjacent ones of the segments are to be chained together, and in response thereto chaining together the selected ones of the video or audio slots to thereby enable a video or audio clip to span more than one of the segments;

accepting from the user, for each video slot included in each segment, a selection or recording of a video clip to populate the video slot;

accepting from the user, for each audio slot included in each segment, a selection or recording of an audio clip to populate the audio slot; and generating and storing on one or more processor readable storage devices, an audio-video project file that is based on the how many segments are included in the project, how many video and audio slots are included in each segment, the video clips that populate video slots, and the audio clips that populate the audio slots.

2. The method of claim 1, wherein in addition to specifying how many video and audio slots, if any, are to be included in the segment to which the effect is applied, each said effect also specifies one or more of the following:

an intro;
an outro;
static graphics;
moving graphics;
a transition;
an opacity;
a background;
a foreground;
a border;
a cut-scene video; or
a post processing procedure.

3. The method of claim 1, further comprising at least one of the following:

accepting from the user, an indication that a new segment is to be added at selected temporal position relative to one or more other one(s) of the segments included in the project, and in response thereto adding the new segment to the project; or accepting from the user, an indication that one of the segments is to be removed from the project, and in response thereto, removing the one of the segments from the project.

4. The method of claim 1, further comprising at least one of the following:

accepting from the user, an indication that a selected one of the segments included in the project is to be moved to from a first temporal position to a second temporal position relative to one or more other one(s) of the segments included in the project, and in response thereto moving the selected one of the segments.

5. The method of claim 1, further comprising:

for each said video slot, providing the user with both an option to record a video clip for inclusion in the video slot, and an option to select a pre-recorded video clip for inclusion in the video slot; and for each said audio slot, providing the user with both an option to record an audio clip for inclusion in the audio slot, and an option to select a pre-recorded audio clip for inclusion in the audio slot.

6. The method of claim 1, further comprising:

for each video clip selected or recorded by the user to be included a said video slot, enabling the user to trim the video clip such that only a portion of the video clip is played when the project is played; and for each audio clip selected or recorded by the user to be included a said audio slot, enabling the user to trim the audio clip such that only a portion of the audio clip is played when the project is played.

7. The method of claim 1, further comprising presenting the project using a display and an audio transducer of a computing device by playing the project file using the computing device.

8. A method for enabling a user to generate an audio-visual project, the method comprising:

accepting from the user a selection of how many temporal segments are to be included in the project;

accepting from the user, for each segment in the project, a selection of an effect that is to be applied to the segment, wherein the selected effect specifies how many video slots are included in the segment and how many audio slots are included in the segment;

for each said video slot, providing the user with both an option to record a video clip for inclusion in the video slot, and an option to select a pre-recorded video clip for inclusion in the video slot; and for each said audio slot, providing the user with both an option to record an audio clip for inclusion in the audio slot, and an option to select a pre-recorded audio clip for inclusion in the audio slot;

accepting from the user, for each video slot included in each segment, a selection or recording of a video clip to populate the video slot;

accepting from the user, for each audio slot included in each segment, a selection or recording of an audio clip to populate the audio slot; and generating and storing on one or more processor readable storage devices, an audio-video project file that is based on the how many segments are included in the project, how many video and audio slots are included in each segment, which video slots are chained together if any, which audio slots are chained together if any, the video clips that populate video slots, and the audio clips that populate the audio slots.

9. The method of claim 8, wherein in addition to specifying how many video and audio slots, if any, are to be included in the segment to which the effect is applied, each said effect also specifies one or more of the following:

an intro;
an outro;
static graphics;
moving graphics;
a transition;
an opacity;
a background;
a foreground;
a border;
a cut-scene video; or
a post processing procedure.

10. The method of claim 8, further comprising:

accepting from the user, an indication that a new segment is to be added at selected temporal position relative to one or more other one(s) of the segments included in the project, and in response thereto adding the new segment to the project; or accepting from the user, an indication that one of the segments is to be removed from the project, and in response thereto, removing the one of the segments from the project.

11. The method of claim 8, further comprising:

accepting from the user, an indication that a selected one of the segments included in the project is to be moved to from a first temporal position to a second temporal position relative to one or more other one(s) of the segments included in the project, and in response thereto moving the selected one of the segments.

12. The method of claim 8, further comprising at least one of the following:
- for each video clip selected or recorded by the user to be included a said video slot, enabling the user to trim the video clip such that only a portion of the video clip is played when the project is played; or
- for each audio clip selected or recorded by the user to be included a said audio slot, enabling the user to trim the audio clip such that only a portion of the audio clip is played when the project is played.

13. The method of claim 8, further comprising presenting the project using a display and an audio transducer of a computing device by playing the project file using the computing device.

14. A computing system that enables a user to generate an audio-visual project, comprising:
- memory that stores effects data that predefines a plurality of effects;
- a user interface configured to accept from the user
  - a selection of how many temporal segments are to be included in the project;
  - for each segment in the project, a selection of one of the effects that is to be applied to the segment, wherein the selected effect specifies how many video slots are included in the segment and how many audio slots are included in the segment;
  - an indication that selected ones of the video or audio slots that are included in adjacent ones of the segments are to be chained together to thereby enable a video or audio clip to span more than one of the segments;
  - for each video slot included in each segment, a selection or recording of a video clip to populate the video slot; and
  - for each audio slot included in each segment, a selection or recording of an audio clip to populate the audio slot; and
- one or more processors configured to generate and store on one or more processor readable storage devices, an audio-video project file that is based on the how many segments are included in the project, how many video and audio slots are included in each segment, which video slots are chained together if any, which audio slots are chained together if any, the video clips that populate video slots, and the audio clips that populate the audio slots.

15. The system of claim 14, wherein in addition to specifying how many video and audio slots, if any, are to be included in the segment to which the effect is applied, each said effect specified by each said skin also specifies one or more of the following:
- an intro;
- an outro;
- static graphics;
- moving graphics;
- a transition;
- an opacity;
- a background;
- a foreground;
- a border;
- a cut-scene video; or
- a post processing procedure.

16. The system of claim 14, wherein:
the user interface, for each said video slot, provides the user with both an option to record a video clip for inclusion in the video slot, and an option to select a pre-recorded video clip for inclusion in the video slot.

17. The system of claim 14, wherein:
the user interface, for each said audio slot, provides the user with both an option to record an audio clip for inclusion in the audio slot, and an option to select a pre-recorded audio clip for inclusion in the audio slot.

18. The system of claim 14, wherein:
the user interface, for each video clip selected or recorded by the user to be included a said video slot, enables the user to trim the video clip such that only a portion of the video clip is played when the project is played.

19. The system of claim 14, wherein:
the user interface, for each audio clip selected or recorded by the user to be included a said audio slot, enables the user to trim the audio clip such that only a portion of the audio clip is played when the project is played.

20. The system of claim 14, further comprising:
an audiovisual device that presents the project when the project file is played.

* * * * *